United States Patent
Wimberly et al.

(10) Patent No.: US 7,280,971 B1
(45) Date of Patent: Oct. 9, 2007

(54) METHOD AND SYSTEM FOR SERVER-BASED ERROR PROCESSING IN SUPPORT OF LEGACY-BASED USAGE AND BILLING SYSTEMS

(75) Inventors: Carie J. Wimberly, Birmingham, AL (US); Kenneth N. Paisley, Birmingham, AL (US); Jeffrey P. Ray, Birmingham, AL (US); Gary R. Tidwell, Birmingham, AL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 1103 days.

(21) Appl. No.: 09/877,181

(22) Filed: Jun. 11, 2001

Related U.S. Application Data

(60) Provisional application No. 60/210,599, filed on Jun. 9, 2000.

(51) Int. Cl.
*G06Q 99/00* (2006.01)
*G06Q 40/00* (2006.01)
*H04M 15/00* (2006.01)

(52) U.S. Cl. .............................. 705/1; 705/34; 705/40

(58) Field of Classification Search ................ 705/412, 705/3–5; 714/746; 715/513–514
See application file for complete search history.

(56) References Cited

U.S. PATENT DOCUMENTS

| | | | | |
|---|---|---|---|---|
| 3,970,996 A | * | 7/1976 | Yasaka et al. .................. | 705/3 |
| 4,287,593 A | * | 9/1981 | Stover ......................... | 370/507 |
| 4,831,526 A | * | 5/1989 | Luchs et al. .................... | 705/4 |
| 5,758,341 A | * | 5/1998 | Voss ............................. | 707/10 |
| 5,790,558 A | * | 8/1998 | Nakamura .................... | 714/704 |
| 5,920,847 A | * | 7/1999 | Kolling et al. ................. | 705/40 |
| 6,058,380 A | * | 5/2000 | Anderson et al. .............. | 705/40 |
| 6,360,211 B1 | * | 3/2002 | Anderson et al. .............. | 705/40 |
| 6,465,206 B1 | * | 10/2002 | Collins .......................... | 435/34 |
| 6,507,826 B1 | * | 1/2003 | Maners ......................... | 705/34 |
| 6,615,258 B1 | * | 9/2003 | Barry et al. ................. | 709/223 |
| 6,714,979 B1 | * | 3/2004 | Brandt et al. ................ | 709/225 |
| 2001/0042080 A1 | * | 11/2001 | Ross ........................... | 707/506 |

FOREIGN PATENT DOCUMENTS

| | | | |
|---|---|---|---|
| JP | 08-320713 A | * | 12/1996 |
| JP | 08320713 A | * | 12/1996 |

OTHER PUBLICATIONS

Schatz, Willie, Pacific Bell Wants to Know . . . 'Who's Calling, Please?', Nov. 23, 1992, Computerworld, vol. 26, http://proquest.umi.com/pqdweb?index=7&sid4=&srchmode=1&vinst=PROD&fmt=3&startpage=-1&clientid=19649&vname=PQD&RQT=309&did=302651&scaling=FULL&ts=1184248818&vtype=PQD&rqt=309&TS=1184248980&clientId=19629&cc=1&TS=1184248980.*

* cited by examiner

*Primary Examiner*—Edward Cosimano
*Assistant Examiner*—Gerardo Araque, Jr.
(74) *Attorney, Agent, or Firm*—Withers & Keys, LLC

(57) ABSTRACT

An error processing system comprising a client/server based PC application supported by SQL Server databases for use with legacy usage metering and billing services. The error processing system provides increased functionality, flexibility and reliability of error processing at a much lower cost than was possible using error processing and correction systems built into legacy usage metering systems. Error processing is simplified for users by implementation of a PC based GUI screens developed in Visual Basic.

12 Claims, 32 Drawing Sheets

FIG. 6

| BRAVO - USAGE DISPLAY SCREEN | | |
|---|---|---|
| RECORD TYPE | 72D | |
| ORIGINATING NPANXX | 205487 | |
| TRMINATING NPANXX | 256277 | |
| CHANGE NPANXX | 256277 | |
| CARRIER ID | 0000 | |
| MESSAGE DATE CC | 19990609 | |
| TRUNK GROUP NUMBER | 0107 | |
| ROUTING INDICATOR | 0 | |
| BILLING RAO | | |
| END OFFICWE CLLI | | |
| OFFICE ID | 110129 | |
| LATA | | |
| 10XXX DIALED INDICATOR | 8 | |
| ACCESS INDICATOR | 0 | |
| ANI INDICATOR | 0 | |
| ANSWER INDICATOR | 0 | |
| BHM TRAFFIC TYPE | 00 | |
| BRAVO ERROR NUMBER | | |
| BST REGION INDICATOR | | |
| CABS COPY INDICATOR | 0 | |
| CABS FIRST CYCLE | 3923 | |
| CABS LNP FIELDS | 010000 | |
| CABS TRAFFIC TYPE | 00 | |
| CABS-CRIS COPY INDICATOR | | |
| CALL EVENT STATUS | 00 | |

|◁ ◁ ▷ ▷| SEARCH DATA [ ] [SEARCH] [PRINT]

REC 0001 OF 0012 | USAGE ID = 11037

BRAVO ADMINISTRATION <T E S T M O D E> - CARLA J. SMITH LOGGED IN  [TRANSACTION APPROVAL MAINTENANCE]

TRANSACTION APPROVAL/LISTING  TRANSACTION APPROVAL MAINTENANCE

| | MSG> | MSG< | MOU> | MOU< | MSGS> | MSGS< | RECS> | RECS< | PEGS> | PEGS< |
|---|---|---|---|---|---|---|---|---|---|---|
| ⊟ K-KENTUCKY | | | | | | | | | | |
|   ⊟ CABS DETAIL | 0 | 0 | 500000 | 0 | 0 | 0 | 0 | 0 | 0 | 31 |
|     ⊟ DELETE | 0 | 0 | 550000 | 0 | 0 | 0 | 0 | 0 | 0 | 50 |
|       ⊟ SA | 0 | 0 | 100 | 0 | 25 | 0 | 0 | 0 | 0 | 1 |
| | 0 | 0 | 0 | 0 | 25 | 0 | 30000 | 0 | 0 | 48 |
|   ⊟ CABS SUMMARY (MPB) | 0 | 0 | 500000 | 0 | 0 | 0 | 250000 | 0 | 0 | 49 |
| | 0 | 0 | | | 0 | | | | | 32 |
| ⊟ Y - JACKSONVILLE | | | | | | | | | | |
|   ⊟ CABS DETAIL | 0 | 0 | 500000 | 0 | 0 | 0 | 0 | 0 | 0 | 37 |
|     ⊟ USER CASE - | 0 | 0 | 250000 | 0 | 0 | 0 | 0 | 0 | 50000 | 52 |
|       TRANS ONLY | 0 | 0 | 0 | 0 | 0 | 0 | 0 | 0 | 0 | 58 |
| | 31 | 0 | 40000 | 13000 | 0 | 0 | 0 | 0 | 0 | 51 |
|   ⊟ CHANGE | 0 | 32 | 80000 | 26000 | 0 | 0 | 0 | 0 | 0 | 54 |

READY      2:05 PM      1/26/2000

FIG. 15

| DETAIL DISPLAY - USAGE ID 38923926 [SAMPLE 1 OF 50 FROM 95 TOTAL RECORDS] | | |
|---|---|---|
| LOAD DATE TIME | 10/06/1999 17:52 | MOU/SECONDS |
| CALL DATE TIME | | ERROR CODE |
| RE ENTERD COUNT | 0 | RECORD LAYOUT |
| RECORD ID | 115001 | BRAVO ERROR NUMBER |
| PRIMARY BILL COMPANY | 7970 | CABS FIRST CYCLE |
| NPANXX | 904854 | DAY BILL PERIOD INDICATOR |
| | | |
| 81 / 0 MESSAGES | 48 | PEGS |
| RV USAGE TYPE | CABS SUMMARY [MPB] | STATUS/TRANSACTION |
| MPB CASE ID | 47641 | TRANSACTION ID |
| IBC BILL DATA RANGE | 990708990807 | RELEASE INDICATOR |
| 3894 IBC BILL PERIOD DATE RANGE CC | 19990708199990807 | RETURN CODE |
| 1 IBC FROM MESSAGE DATE | 990708 | ROUTIN INDICATOR |

```
      ----+----1----+----2----+----3----+----4----+----5----+----6----+----7----+----8----+----9----+----0
000   11500199072299070899080790485425303430000011110000000081000000004835000000007970FLJCVLFLSMDSOJCVLFLSM
100   DSoD9043500560099080719990807000452000025530004820M00253LTL     71999072219990708199908070  0
200   00000000000018A013379767018A013179767999A0000000000000000000000009A000000000000000008     0
300                                                        RV              3894
400                                                                                   0
```

FIG. 16

BRAVO - EMPLOYEE TRANSACTION REPORT - DETAILS W/ COMMENTS
WEDNESDAY, NOVEMBER 01, 2000
CURRENTLY VIEWING
TRACY CLICK      ALABAMA

| TRANS-DATE | MSGS | MOU | START-DATE | END-DATE | STATUS |
|---|---|---|---|---|---|

ERR CODE: R0   CASE-ID: 119975

| 10/24/2000 | 77 | 105 | 09/05/2000 | 10/18/2000 | WRITE OFF CC |

COMMENTS:
PERIBIS AGREMENT AND USAGE BEEN STOPED FOR FIVE DAYS AND
EACH OFFICE IS LESS THAN 100 MOUS

ERR CODE: R0   CASE-ID: 120318

| 10/25/2000 | 3 | 1 | 10/19/2000 | 10/19/2000 | WRITE OFF CC |

COMMENTS:
PERIBIS AGREMENT AND USAGE BEEN STOPED FOR FIVE DAYS AND
EACH OFFICE IS LESS THAN 100 MOUS

FIG. 17

USER TRANSACTION REPORT BY EMPLOYEE W/ CASE-DEFINITION

BRAVO - EMPLOYEE TRANSACTION W/ COMMENTS AND CASE-DEFINITIONS
WEDNESDAY, NOVEMBER 01, 2000

CURRENTLY VIEWING
AMANDA BAGWELL        JACKSONVILLE

| CASE-DEFINITION | ERROR-CODE: | H7 | CASE-ID: 29711 | TRANS-DATE | MSGS | MOU | START-DATE | END-DATE |
|---|---|---|---|---|---|---|---|---|
| | | | | 10/25/00 1:10 PM | 351 | 1,910 | 10/12/2000 | 10/23/2000 |

* CASE NAME CIC="0000" CASE ID 29711 CASE NUMBER U029711
CASE CREATED ON SEPTEMBER 21, 1999
SQL GENERATED ON NOVEMBER 1, 2000 AT 10:39 AM

SELECT COUNT(*)
FROM USAGE U
WHERE (( U CAMER_CODE = '0000'))

[TEXT OBJECT]

COMMENS: SEPTEMBER 21, 1999  2:12 PM    COMMENT ENTERD BY : AMANDA BAGWELL
TROUBLE TICKET TO (TTS # 373958)H7 ERRORS W/
ORIGINATING #'S IN RECORD
H7 ERRORS W/ ORIGINATING #'S IN RECORD

DECEMBER6, 1999 8:11 AM    WRITE OFF TRANSACTION
WRITE OFF USAGE PER BOB CUNNINGHAM IN RESPONSE
TO TTS 373958, SWITCH PROBLEM SHOULD BE CORRECTED
WRITE OFF USAGE PER BOB CUNNINGHAM IN RESPONSE
TO TTS 373958, SWITCH PROBLEM SHOULD BE CORRECTED
2000

| ◁ | 1 OF 1 | ▷▷▷ | □ | 100% ▷ | | TOTAL 2 | 100% | 2 OF 2 |

BRAVO USAGE - CHANGE NPA/NXX
TUESDAY, DECEMBER 07, 1999                    SITE: _____ ALABAMA _____

| MAG DATE | ERROR | CLLI | OFFICE | CIC | REC | NPA/NXX | CABS TT | TRUNK | CASE | MSGS | MOU |
|---|---|---|---|---|---|---|---|---|---|---|---|
| 12/05/1999 | RF | BRHMALRCDSO | 110216 | 0288 | 71D | 205988 | 00 | 0110 | | 1 | 63.19 |
| 12/06/1999 | RF | BRHMALRCDSO | 110216 | 0288 | 71D | 205988 | 00 | 0110 | | 1 | 0.80 |
| | | | | | | | | | GRAND TOTAL | 2 | 64.00 |

FIG. 19

BRAVO USAGE - ORIGINATING NPA/NXX
TUESDAY, DECEMBER 07, 1999

SITE: ALABAMA

| MAG DATE | ERROR | CLLI | OFFICE | CIC | REC | NPA/NXX | CABS TT | TRUNK | CASE | MSGS | MOU |
|---|---|---|---|---|---|---|---|---|---|---|---|
| 11/14/1999 | SA | SELMALAGCM1 | 110114 | 0288 | 72D | 205988 | 33 | 0129 | 45,249 | 1 | 2.41 |
| 11/19/1999 | SA | PHCYALMADSO | 110117 | 0288 | 72D | 205988 | 99 | 0126 | | 1 | 0.00 |
| 11/22/1999 | SA | PHCYALMADSO | 110117 | 0288 | 72D | 205988 | 99 | 0126 | | 1 | 0.00 |
| 11/29/1999 | SA | RONKALXADS2 | 110163 | 0288 | 72D | 205988 | 36 | 0344 | | 1 | 5.17 |
| 12/01/1999 | SA | SELMALAGCM1 | 110114 | 0288 | 72D | 205988 | 33 | 0129 | 45,249 | 1 | 1.25 |
| 12/05/1999 | RF | BRHMALRCDSO | 110216 | 0288 | 71D | 205988 | 00 | 0110 | | 1 | 63.19 |
| 12/06/1999 | RF | BRHMALRCDSO | 110216 | 0288 | 71D | 205988 | 00 | 0110 | | 1 | 0.60 |
| | | | | | | | | | GRAND TOTAL | 7 | 72.61 |

FIG. 20

| | | | | | | GROUPED BY TRANSACTION-MONTH, SITE, ERROR-CODE |
|---|---|---|---|---|---|---|
| DELETE SUMMARY REPORT - DETAIL USAGE | | | | | | |
| TUESDAY, DECEMBER 07, 1999 | | SITE: | ALABAMA | | | SORTED BY TRANSACTION-MONTH DESC, ERROR-CODE |

TRANSACTION-MONTH: NOVEMBER

| ERROR CODE | MSGS | MOU | STATUS | | START DATE | END DATE |
|---|---|---|---|---|---|---|
| RO | 239 | 15 | DELETE COMPLETE | | 10/29/1999 | 11/17/1999 |
| RY | 1,818 | 7,654 | DELETE COMPLETE | | 09/02/1999 | 11/25/1999 |

SUMMARY FOR 'SITE' = ALABAMA       (2 DETAIL RECORDS)

SUB TOTAL             2,057     7,669

GRAND TOTAL           2,057     7,669

FIG. 22

| | 2 OF 2 | ◁ ◁▷ ▷ | □ | 🖬 🖨 | 100% ▽ | TOTAL 22 | 100% | 22 OF 22 | |
|---|---|---|---|---|---|---|---|---|---|

WRITEOFF SUMMARY REPORT - MPB          GROUPED BY TRANSACTION-MONTH, SITE, ERROR-CODE
TUESDAY, DECEMBER 07, 1999    SITE:    ALABAMA          SORTED BY TRANSACTION-MONTH DESC, ERROR-CODE

TRANSACTION-MONTH: NOVEMBER

| ERROR CODE | MSGS | MOU | STATUS | START DATE | END DATE |
|---|---|---|---|---|---|
| BK | 84 | 0 | WRITE OFF COMPL | 09/23/1999 | 11/27/1999 |
| H7 | 310 | 715 | WRITE OFF COMPL | 10/26/1999 | 11/11/1999 |
| H8 | 497 | 655 | WRITE OFF COMPL | 09/01/1999 | 11/04/1999 |
| HW | 1,609 | 1,499 | WRITE OFF COMPL | 08/21/1999 | 09/28/1999 |
| RO | 678 | 663 | WRITE OFF COMPL | 10/01/1999 | 11/24/1999 |
| R3 | 71 | 416 | WRITE OFF COMPL | 10/25/1999 | 11/20/1999 |
| RC | 2,370 | 3,172 | WRITE OFF COMPL | 08/12/1999 | 11/28/1999 |
| RF | 109 | 183 | WRITE OFF COMPL | 10/18/1999 | 11/14/1999 |
| RG | 1 | 1 | WRITE OFF COMPL | 10/15/1999 | 10/15/1999 |
| RJ | 33 | 32 | WRITE OFF COMPL | 10/20/199 | 11/20/1999 |
| RN | 73 | 33 | WRITE OFF COMPL | 10/19/1999 | 11/09/1999 |
| RS | 53 | 17 | WRITE OFF COMPL | 08/28/1999 | 11/07/1999 |
| RU | 3,434 | 10,757 | WRITE OFF COMPL | 10/18/1999 | 11/26/1999 |
| RX | 120 | 294 | WRITE OFF COMPL | 10/21/1999 | 11/09/1999 |
| RY | 184 | 1,101 | WRITE OFF COMPL | 09/02/1999 | 10/28/1999 |
| SA | 904 | 593 | WRITE OFF COMPL | 10/28/1999 | 11/09/1999 |
| SA | 10,610 | 20,73 | WRITE OFF COMPL | 01/04/1999 | 11/17/1999 |
| 19 | 81 | 177 | WRITE OFF COMPL | 09/30/1999 | 11/08/1999 |

SUMMARY FOR 'SITE' = ALABAMA    (17 DETAIL RECORDS)
SUB TOTAL    21,221    41,281

GRAND TOTAL    23,043    45,383

FIG. 23

| DETAIL CORRECTION INFORMATION BY ERROR-CODE | | | | | TRANSACTION-DATE: | 12/01/1999 | |
|---|---|---|---|---|---|---|---|
| DECEMBER 07, 1999 | SITE: | ALABAMA | | | CYCLE NO: | 0 | |
| CARRIER | ERROR CODE | RECORDS | MSGS | MOU | PEGS | START DATE | END DATE |
| 0187 | | | | | | | |
| | RO | 16 | 16 | 28 | 0 | 11/29/1999 | 11/29/1999 |
| 0187 SUB TOTAL | 1 | 16 | 16 | 28 | 0 | 11/29/1999 | 11/29/1999 |
| 0222 | | | | | | | |
| | RO | 3 | 3 | 3 | 0 | 11/29/1999 | 11/29/1999 |
| 0222 SUB TOTAL | 1 | 3 | 3 | 3 | 0 | 11/29/1999 | 11/29/1999 |
| 0288 | | | | | | | |
| | RO | 19 | 19 | 56 | 0 | 11/29/1999 | 11/29/1999 |
| 0288 SUB TOTAL | 1 | 19 | 19 | 56 | 0 | 11/29/1999 | 11/29/1999 |
| 0333 | | | | | | | |
| | RO | 267 | 267 | 73 | 0 | 11/29/1999 | 11/29/1999 |
| 0333 SUB TOTAL | 1 | 267 | 267 | 73 | 0 | 11/24/1999 | 11/29/1999 |
| 0432 | | | | | | | |
| | RO | 4 | 4 | 12 | 0 | 11/29/1999 | 11/29/1999 |
| 0432 SUB TOTAL | 1 | 4 | 4 | 12 | 0 | 11/29/1999 | 11/29/1999 |
| 0444 | | | | | | | |
| | RO | 2 | 2 | 2 | 0 | 11/29/1999 | 11/29/1999 |
| 0444 SUB TOTAL | 1 | 2 | 2 | 2 | 0 | 11/29/1999 | 11/29/1999 |
| ALABAMA GRAND TOTAL | 6 | 311 | 311 | 174 | 0 | 11/24/1999 | 11/29/1999 |

FIG. 24

| BRAVO AGING REPORT WHERE MINUTES-OF-USE >4000 | | | | | | | | GROUPED BY ERROR-CODE, CIC |
|---|---|---|---|---|---|---|---|---|
| NOVEMBER 01, 2000 | | | SITE: | MISSISSIPPI | | | | |
| ERRORCODE | CIC | TRUNK-GROUP | LATA | 0-TO-15 | 16-TO-60 | 61-TO-90 | >90 | TOTAL |
| SA | 0288 | 0138 | 482 | 119,705 | 0 | 0 | 0 | 119,705 |
| RG | 0000 | 0019 | 482 | 55,232 | 0 | 0 | 0 | 55,232 |
| SA | 0222 | 0025 | 482 | 47,836 | 40 | 20 | 11 | 47,907 |
| SA | 0555 | 0119 | 482 | 40,972 | 10,215 | 0 | 0 | 51,187 |
| SA | 0444 | 0277 | 484 | 29,285 | 0 | 0 | 0 | 29,285 |
| SA | 0284 | 0129 | 482 | 21,157 | 8,515 | 0 | 0 | 29,672 |
| SA | 0288 | 0053 | 482 | 11,537 | 1,748 | 0 | 0 | 13,285 |
| SA | 5158 | 0253 | 482 | 10,563 | 8,125 | 0 | 0 | 18,688 |
| SA | 0811 | 0244 | 482 | 8,893 | 4,212 | 0 | 0 | 13,105 |
| SA | 5158 | 0564 | 484 | 7,571 | 9,806 | 0 | 0 | 17,377 |
| T9 | 0288 | 0015 | 482 | 7,446 | 8,602 | 0 | 0 | 16,048 |
| SA | 6262 | 0578 | 482 | 6,859 | 1,800 | 0 | 63 | 15,588 |
| SA | 5158 | 0206 | 482 | 4,018 | 11,570 | 0 | 0 | 6,677 |
| T9 | 0222 | 0051 | 482 | 3,268 | 3,409 | 0 | 0 | 4,340 |
| RF | 0387 | 0405 | 482 | 2,167 | 2,174 | 0 | 0 | 4,152 |
| SA | 5102 | 0185 | 482 | 1,721 | 2,432 | 509 | 0 | 5,724 |
| SA | 5158 | 0190 | 482 | 1,249 | 4,475 | 1,112 | 0 | 5,816 |
| SA | 0432 | 0431 | 484 | 1,091 | 1,459 | 553 | 2,777 | 6,669 |
| SA | 6286 | 0100 | 484 | 894 | 2,004 | 856 | 2,659 | 4,576 |
| SA | 6286 | 0102 | 482 | 781 | 2,064 | 987 | 1,179 | 4,443 |
| SA | 5957 | 0129 | 482 | 738 | 2,869 | 2,455 | 0 | 6,752 |
| SA | 0834 | 0066 | 482 | 678 | 1,438 | 2,455 | 3,650 | 7,246 |
| SA | 5349 | 0346 | 482 | 658 | 2,940 | 1,193 | 1,193 | 6,979 |

BRAVO AGING REPORT WHERE PAGES AND/OR MESSAGES >1000  
NOVEMBER 01, 2000    SITE: SOUTH CAROLINA    TOTAL 66   100%   66 OF 66   GROUPED BY ALL-TT VS TT99   SORTED BY 16-TO-60, 61-TO-90

| OPC | REC-TYPE | TT | ERRORCODE | LATA | 16-TO-60 | 61-TO-90 | 0-TO-15 | > 90 | TOTAL |
|---|---|---|---|---|---|---|---|---|---|
| 005 057 016 | 72S | 85 | SA | 434 | 9,099 | 1,399 | 2,841 | 365 | 13,704 |
| 005 057 016 | 72S | 85 | SU | 436 | 4,320 | 0 | 2,136 | 0 | 6,456 |
| 005 006 163 | 72L | 00 | TS | | 1,494 | 890 | 857 | 12 | 3,253 |
| 233 354 249 | 72L | 00 | TS | | 1,408 | 0 | 134 | 0 | 1,542 |
| 248 031 100 | 72L | 00 | TS | | 1,390 | 891 | 219 | 148 | 2,648 |
| 001 070 050 | 72L | 00 | TS | | 1,275 | 729 | 434 | 875 | 3,313 |
| 232 050 001 | 72L | 00 | TS | | 1,272 | 0 | 0 | 0 | 1,272 |
| 233 254 239 | 72L | 00 | TS | | 1,117 | 0 | 0 | 0 | 1,117 |
| 248 130 044 | 72L | 00 | TS | | 1,064 | 646 | 475 | 840 | 3,025 |
| 240 137 007 | 72L | 00 | TS | | 1,063 | 0 | 437 | 0 | 1,500 |
| 248 032 004 | 72L | 00 | TS | | 1,028 | 0 | 1,249 | 0 | 2,277 |
| 248 132 014 | 72L | 00 | TS | | 969 | 474 | 453 | 713 | 2,609 |
| 252 000 000 | 72S | 85 | SA | 422 | 948 | 0 | 4,072 | 0 | 5,020 |
| 243 003 175 | 72L | 00 | TS | | 926 | 544 | 455 | 1,019 | 2,944 |
| 240 133 059 | 72L | 00 | TS | | 920 | 0 | 627 | 0 | 1,547 |
| 234 125 001 | 72L | 00 | TS | | 885 | 309 | 628 | 474 | 2,296 |
| 240 136 004 | 72L | 00 | TS | | 876 | 0 | 380 | 0 | 1,256 |
| 005 040 012 | 72L | 00 | TS | | 863 | 520 | 447 | 604 | 2,434 |
| 227 094 156 | 72L | 00 | TS | | 855 | 128 | 468 | 99 | 1,550 |
| 210 118 005 | 72L | 00 | TS | | 853 | 0 | 444 | 0 | 1,297 |
| 240 033 003 | 72L | 00 | TS | | 830 | 0 | 719 | 0 | 1,549 |
| 240 149 051 | 72L | 00 | TS | | 822 | 0 | 427 | 0 | 1,249 |
| 240 163 005 | 72L | 00 | TS | | 799 | 0 | 471 | 0 | 1,270 |

| | | | | | | | GROUPED BY TT, CIC, EC, LATA |
|---|---|---|---|---|---|---|---|
| BRAVO AGING DA AND OTHER REPORT | | | | | | | |
| WEDNESDAY NOVEMBER 01, 2000 | | SITE: | NORTH CAROLINA | | | | SORTED BY 16-TO-60, 61-TO-90 |
| TT | CIC | ERRORCODE | LATA | 16-TO-60 | 61-TO-90 | 0-TO-15 | > 90 | TOTALS |
| OTHER | | | | | | | | |
| 99 | 1044 | SA | 426 | 1,310 | 725 | 0 | 3,045 | 5,080 |
| 99 | FG A | SA | 430 | 652 | 274 | 138 | 0 | 1,064 |
| 51 | 5703 | SA | 424 | 461 | 171 | 125 | 130 | 887 |
| 51 | 5253 | SA | 424 | 350 | 120 | 102 | 328 | 900 |
| 00 | 0000 | RC | 424 | 341 | 231 | 135 | 808 | 1,515 |
| 51 | 5892 | SA | 426 | 298 | 106 | 104 | 296 | 804 |
| 00 | 0000 | RC | 424 | 225 | 140 | 53 | 374 | 792 |
| 99 | FG A | SA | 436 | 220 | 56 | 51 | 0 | 327 |
| 51 | 5892 | SA | 424 | 129 | 0 | 73 | 0 | 202 |
| 99 | FG A | SA | 422 | 84 | 0 | 0 | 1 | 85 |
| 51 | 0292 | SA | 424 | 64 | 0 | 0 | 0 | 64 |
| 51 | 5496 | SA | 424 | 61 | 0 | 17 | 26 | 104 |
| 00 | 0000 | H7 | 000 | 57 | 39 | 4 | 12 | 112 |
| 16 | 6286 | SA | 426 | 36 | 2 | 0 | 31 | 69 |
| 09 | 0636 | SA | 424 | 33 | 11 | 9 | 164 | 217 |
| 51 | 6484 | SA | 422 | 31 | 7 | 14 | 1 | 53 |
| 99 | FG A | RS | 442 | 26 | 0 | 0 | 0 | 26 |
| 16 | 0288 | SA | 424 | 23 | 11 | 2 | 90 | 126 |
| 16 | 0805 | SA | 422 | 21 | 7 | 0 | 0 | 28 |
| 09 | 0643 | SA | 428 | 15 | 0 | 0 | 35 | 50 |
| 16 | 0942 | SA | 426 | 11 | 0 | 2 | 2 | 13 |
| 99 | FG A | SA | 432 | 11 | 7 | 2 | 0 | 20 |

FIG. 27

| ERRORCODE | CIC | IT $# | CASE# | COMMENT TYPE | START-DATE | END-DATE | MSGS | MOU | PEGS |
|---|---|---|---|---|---|---|---|---|---|
| 0348 | 419996 | 116847 | TROUBLE TICKET | 06/27/2000 | 10/24/2000 | 4 | 0.00 | 4 |
| 0393 | 419996 | 116847 | TROUBLE TICKET | 05/16/2000 | 10/27/2000 | 61 | 0.00 | 74 |
| 0432 | 419996 | 116847 | TROUBLE TICKET | 05/13/2000 | 10/28/2000 | 1,053 | 0.00 | 21,413 |
| 0444 | 419996 | 116847 | TROUBLE TICKET | 05/13/2000 | 10/28/2000 | 791 | 0.00 | 21,093 |
| 0450 | 419996 | 116847 | TROUBLE TICKET | 05/22/2000 | 10/26/2000 | 41 | 0.00 | 58 |
| 0457 | 419996 | 116847 | TROUBLE TICKET | 05/13/2000 | 10/27/2000 | 257 | 0.00 | 821 |
| 0488 | 419996 | 116847 | TROUBLE TICKET | 12/26/1999 | 09/23/2000 | 383 | 0.00 | 1,666 |
| 0511 | 419996 | 116847 | TROUBLE TICKET | 05/15/2000 | 09/22/2000 | 14 | 0.00 | 51 |
| 0555 | 419996 | 116847 | TROUBLE TICKET | 05/13/2000 | 10/28/2000 | 913 | 0.00 | 38,985 |
| 0569 | 419996 | 116847 | TROUBLE TICKET | 06/08/2000 | 08/23/2000 | 3 | 0.00 | 5 |
| 0643 | 419996 | 116847 | TROUBLE TICKET | 06/23/2000 | 06/28/2000 | 2 | 0.00 | 3 |
| 0690 | 419996 | 116847 | TROUBLE TICKET | 06/12/2000 | 06/12/2000 | 1 | 0.00 | 1 |
| 0752 | 419996 | 116847 | TROUBLE TICKET | 06/17/2000 | 10/28/2000 | 52 | 0.00 | 87 |
| 0789 | 419996 | 116847 | TROUBLE TICKET | 10/02/2000 | 10/02/2000 | 1 | 0.00 | 1 |
| 0807 | 419996 | 116847 | TROUBLE TICKET | 05/13/2000 | 10/28/2000 | 709 | 0.00 | 8,834 |
| 0833 | 419996 | 116847 | TROUBLE TICKET | 05/13/2000 | 10/28/2000 | 534 | 0.00 | 5,631 |
| 0869 | 419996 | 116847 | TROUBLE TICKET | 06/16/2000 | 07/10/2000 | 33 | 0.00 | 77 |
| 0948 | 419996 | 116847 | TROUBLE TICKET | 05/14/2000 | 10/28/2000 | 438 | 0.00 | 1,267 |
| 0333 | | 119226 | OTHER | 10/02/2000 | 10/03/2000 | 870 | 32,925.03 | 0 |
| 5374 | | 120490 | OTHER | 05/26/2000 | 10/29/2000 | 143,153 | 159.90 | 0 |
| 0222 | | 120564 | OTHER | 01/28/2000 | 10/30/2000 | 774 | 0.00 | 0 |
| 0333 | | 120564 | OTHER | 01/19/2000 | 10/30/2000 | 2,213 | 0.00 | 0 |
| 0432 | | 120564 | OTHER | 01/19/2000 | 10/30/2000 | 12,247 | 0.00 | 0 |
| 0444 | | 120564 | OTHER | 01/19/2000 | 10/30/2000 | 50,072 | 0.00 | 0 |
| 0555 | | 120564 | OTHER | 01/19/2000 | 10/30/2000 | 2,095 | 0.00 | 0 |
| 0833 | | 120564 | OTHER | 01/19/2000 | 10/31/2000 | 33,650 | 0.00 | 0 |
| 5374 | | 120564 | OTHER | 01/19/2000 | 10/30/2000 | 1,865 | 0.00 | 0 |
| 5892 | | 120564 | OTHER | 01/20/2000 | 10/30/2000 | 412 | 0.00 | 0 |
| 5374 | | 120581 | OTHER | 10/07/2000 | 10/26/2000 | 53,635 | 0.00 | 0 |
| SA SUBTOTAL | | | | | | | 420,674 | 33,084.93 | 1,399,745 |

FIG. 28

| 2 OF 2 | | 100% | TOTAL 75 | 100% | 75 OF 75 | | |

BRAVO-ERROR MASTER FILE - MPB
TUESDAY, DECEMBER 07, 1999      SITE: ALABAMA                              SORTED BY ERROR-CODE

| ERRCODE | DESCRIPTION | CYCLENO | PEGS | MSGS | MOU |
|---|---|---|---|---|---|
| SA | UNIDENTIFIED USAGE | 4014 | 0 | 526 | 1,266 |
| SA | UNIDENTIFIED USAGE | 4018 | 0 | 11,381 | 9,900 |
| SA | UNIDENTIFIED USAGE | 4023 | 0 | 93,279 | 310,519 |
| SA | UNIDENTIFIED USAGE | 4026 | 0 | 4,361 | 11,761 |
| SA | UNIDENTIFIED USAGE | 4032 | 0 | 9,754 | 29,459 |
| SA | UNIDENTIFIED USAGE | 4033 | 0 | 621,533 | 1,370,816 |
| SA | UNIDENTIFIED USAGE | 4034 | 0 | 212 | 823 |
| SA | UNIDENTIFIED USAGE | 4035 | 0 | 11,072 | 9,610 |
| SA | UNIDENTIFIED USAGE | 4035 | 0 | 472,356 | 13,832,049 |
| SA | UNIDENTIFIED USAGE | 4036 | 0 | 138 | 1,088 |
| SA | UNIDENTIFIED USAGE | 4036 | 0 | 3,669 | 9,428 |
| SA | UNIDENTIFIED USAGE | 4037 | 0 | 0 | 718 |
| SA | UNIDENTIFIED USAGE | 4038 | 0 | 2,355 | 10,337 |
| SA | UNIDENTIFIED USAGE | 4042 | 0 | 380,680 | 1,316,770 |
| SA | UNIDENTIFIED USAGE | 4046 | 0 | 113,994 | 414,406 |
| SA | UNIDENTIFIED USAGE | 4046 | 0 | 1,853,486 | 6,233,398 |
| SB | INVALID TRAFFIC TYPE | 3969 | 0 | 36 | 65 |
| SB | INVALID TRAFFIC TYPE | 3984 | 0 | 20 | 25 |
| SB | INVALID TRAFFIC TYPE | 4004 | 0 | 17 | 37 |
| SB | INVALID TRAFFIC TYPE | 4026 | 0 | 4 | 17 |
| ST | UNKNOWN | 0 | 0 | 0 | 2,166 |
| SU | INVALID MESSAGE FORMA | FO 3930 | 0 | 859 | 5,703 |
| SU | INVALID MESSAGE FORMA | FO 3952 | 0 | 244 | 1,177 |
| SU | INVALID MESSAGE FORMA | FO 3952 | 0 | 301 | 1,203 |
| SU | INVALID MESSAGE FORMA | FO 3969 | 0 | 455 | 2,454 |
| | | | 0 | 61,732,766 | 15,587,249 |

GRAND TOTAL: 75

| AGING REPORTS - USAGE CASES ON HOLD | | | | | | |
|---|---|---|---|---|---|---|
| BRAVO - CASES ON HOLD CABS DETAILS | | | | SORTED BY IBIS-CASE# | | |
| WEDNESDAY NOVEMBER 01, 2000 | | SITE: | NORTH CAROLINA | | | |
| IBIS-CASE# | BRAVO_CASE# | ERROR-CODE | CIC | START-MSGDATE | END-MSGDATE | MOU | PEGS |
| 101894 | | TS | | | 06/23/2000 | 07/31/2000 | 0 | 21,203 |
| | SUBTOTAL | TS | 0 | | | | 21,203 |
| 101900 | | TS | | | 06/23/2000 | 07/30/2000 | 0 | 72,778 |
| | SUBTOTAL | TS | 0 | | | | 72,778 |
| 101923 | | TS | | | 05/03/2000 | 07/30/2000 | 0 | 101,330 |
| | SUBTOTAL | TS | 0 | | | | 101,330 |
| 101967 | | TS | | | 12/18/2000 | 10/30/2000 | 0 | 1,680 |
| | SUBTOTAL | TS | 0 | | | | 1,680 |
| 101983 | | TS | | | 1/15/2000 | 10/30/2000 | 0 | 5,920 |
| | SUBTOTAL | TS | 0 | | | | 5,920 |
| 101987 | | TS | | | | | | |

| ERROR-CODE | CIC | LATA | BRAVO-CASE# | MSGS | MOU | START-DATE | END-DATE |
|---|---|---|---|---|---|---|---|
| SA | 0000 | 000 | | 12 | 8.00 | 06/07/1999 | 07/14/1999 |
| RC | 0000 | 000 | | 8 | 6.00 | 11/30/1999 | 12/05/1999 |
| | | | GRAND TOTAL | 20 | 14.00 | 06/07/1999 | 12/05/1999 |

BRAVO - BILL GUARANTEE - IOS / 72V
TUESDAY, DECEMBER 07, 1999

SITE: ALABAMA

FIG. 31

BRAVO - BILL GUARANTEE - OTS/CABSTT = 86
WEDNESDAY, NOVEMBER 01, 2000                               SITE: _____KENTUCKY_____

| ERROR-CODE | CIC | IND | LATA | BRAVO-CASE# | MSGS | MOU | START-DATE | END-DATE |
|---|---|---|---|---|---|---|---|---|
| SA | 0222 | 7 | 462 | 103280 | 11 | 25.00 | 05/25/2000 | 10/10/2000 |
| SA | 0288 | 7 | 462 | 103280 | 152 | 573.06 | 05/20/1999 | 10/24/2000 |
| SA | 0333 | 7 | 462 | 103280 | 7 | 19.48 | 07/28/2000 | 09/26/2000 |
| SA | 0374 | 7 | 462 | 103280 | 1 | 0.84 | 0613/2000 | 06/13/2000 |
| SA | 0427 | 7 | 462 | 103280 | 1 | 2.79 | 07/14/2000 | 07/14/2000 |
| SA | 0682 | 7 | 462 | 103280 | 1 | 1.18 | 09/18/2000 | 09/18/2000 |
| SA | 0938 | 7 | 462 | 103280 | 1 | 3.02 | 05/31/2000 | 05/31/2000 |
| SA | 0006 | 0 | 462 | | 1 | 1.81 | 10/22/2000 | 10/22/2000 |
| SA | 0212 | 0 | 462 | | 5 | 7.38 | 08/10/2000 | 10/18/2000 |
| SA | 0223 | 0 | 462 | | 1 | 0.78 | 10/24/2000 | 10/24/2000 |
| SA | 0662 | 0 | 462 | | 3 | 12.12 | 09/18/2000 | 10/30/2000 |
| | | | | GRAND TOTAL: | 184 | 647.46 | 05/20/1999 | 10/30/2000 |

FIG. 32

METHOD AND SYSTEM FOR SERVER-BASED ERROR PROCESSING IN SUPPORT OF LEGACY-BASED USAGE AND BILLING SYSTEMS

This application claims the benefit of U.S. Provisional Application No. 60/210,599 filed Jun. 9, 2000 which is herein incorporated by reference in its entirety.

BACKGROUND

1. Field of the Invention

The present invention relates to error processing and correction for legacy computer systems and applications. More particularly, the present application relates to error processing and correction for utilities and telecommunications service providers.

2. Background of the Invention

In many commercial settings a service or product provider (also referred to herein as "provider") performs certain services or provides products to its customers on one date and then bills those customers at a later date. Often times, the bills are cumulative of several days, weeks or months, of usage of the services or products offered. Elaborate tracking and billing systems have been developed over time to record the customer's usage and generate bills or invoices for delivery to the customer. Such tracking and billing systems can become very complex in situations where the provider offers multiple lines of services and products, each having different rates or prices, or where the provider offers volume discount rates and prices or other special offers to customers. The tracking and billing operations become even more complex when the provider also serves as an intermediary between the customers and other providers. Tracking and billing operations are commonly performed in utilities-related industries because of the metered nature of the products and services provided to consumers. Such operations are also used in telecommunications services to track the use of and to bill for local and long distance telephone service and associated enhancements (such as, e.g., caller-id, privacy screening, and the like.) Other examples of tracking and billing operations include those used in the home entertainment industry such as cable television satellite television services, particularly those offering pay-per-view services.

Traditional tracking and billing operations, i.e., those developed for highly regulated industries such as utilities and telecommunications, have been very stable systems because they were based on highly customized applications designed to perform a limited tracking or billing function for a particular service or industry. Software applications used in such tracking and billing systems have been very large-scale programs which were designed to operate on mainframe computer systems such as provided by IBM or Amdahl. Because of the high customization and the criticality of such tracking and billing operations, any changes to the software code usually must support all prior functionality. Such established applications are often referred to in the art as "legacy systems" because they have been handed down from one generation of software to the next, generally without major changes that would affect existing capabilities. As a consequence, these legacy systems have been very difficult to upgrade or integrate with other systems as the industry has evolved. To maintain stability and compatibility, the software applications have been strictly controlled so that any changes to the code require much fault-testing and operational verification prior to actual implementation in the live systems.

Conventional billing and tracking architectures typically comprise multiple billing and tracking sites with multiple billing and tracking systems deployed at each site. As discussed above, because many of these billing and tracking systems are legacy systems with little or no integration, changes at one site or in one billing and tracking system may need to be repeated at other sites or in other systems. FIG. 1A is a schematic diagram showing a typical layout for conventional billing and tracking systems for multiple sites. Tracking and billing site 110 has one or more computers systems for collecting usage data and generating billing records. In FIG. 1A, site 110 has computer system 112 for collecting raw usage data from metered systems or services (not shown in FIG. 1A). Raw usage data from computer system 112 is provided to computer 114 for error detection and other data processing before being provided to computer system 116 for final processing of billable usage data which is then sent to a bill generator (not shown in FIG. 1A). As shown in FIG. 1A, other tracking and billing sites 130 and 140 include multiple computer systems providing essentially the same functions as provided by computer systems 112, 114 and 116 at tracking and billing site 110. Computer systems 112, 114 and 116 shown in FIGS. 1A and 1B may comprise a single computer system having one or more non-volatile data storage media.

FIG. 1B shows a more detailed schematic diagram of the computer systems and the functions performed by each system at conventional tracking and billing system 110. Raw usage data received from metered systems (not shown in FIG. 1B) is stored in database 117 on computer system 112. The raw usage data from database 117 is routinely provided to computer system 116 for by error/usage function 118. As used herein, a function comprises the computer hardware and software associated with a general process performed on a computer system. Function 118 passes valid usage records on to computer system 116 for storage in database 120. The usage records stored in database 120 comprise the billable usage records that are subsequently fed to a bill generator system (not shown in FIG. 1B). Function 118 also sends records having usage errors to computer system 116 for storage in database 122. Correction function 123 on computer system 116 analyzes and corrects the records stored in database 122 then sends the corrected records back to computer system 112. The corrected records are stored in database 124 on computer system 112. Computer system 112 sends the corrected records from database 124 to computer system 114 for processing by error/usage function 118 along with the raw usage records from database 117.

Because error correction function 123 is embedded into computer system 116, changes related to error correction processes cannot be rapidly implemented. Any such change would need to be thoroughly tested to ensure no software coding errors or other vulnerabilities have been introduced in the operational system. Even when such a change is successfully implemented at a site, the change is only available at that site. If the billing and tracking function is also carried out at other sites, the changes would have to be duplicated independently at each site. Moreover because each site may have its own unique configuration, the system testing described above would need to be duplicated at each site.

Error processing systems are a critical component of both tracking and billing systems. This is especially true when the tracking or billing operation supports hundreds of thousands, even millions, of customers and when the value of each individual service and product sold is insignificant. In such cases, manually correcting errors in individual discrepancies would be too costly in light of the small revenue associated with the individual item or customer. Accordingly, software applications for automating resolution of errors in tracking or billing records have been incorporated into legacy systems. Because the error processing systems have been imbedded in the legacy system, changes to the application have been subject to the same rigid controls described above.

Prior to deregulation of the utilities and telecommunications industries, there was little need for rapidly implementing changes in the tracking or billing applications to accommodate changes in business goals or operational procedures. In today's competitive environment, service providers must be able implement changes rapidly as the business expands into new territories or otherwise transforms its operations.

Due to the problems/limitations with the legacy error processing systems described above, as well as the need to have an effective system to handle error messages from multiple sources, a new wholesale error processing and correction system is needed.

SUMMARY OF THE INVENTION

In one embodiment, the present invention provides a system for processing and correcting errors in a usage data collected on a legacy system for use in a bill for a metered service, said system comprising a server computer comprising a usage errors database, a load function, a master database, a strip function and a corrected usage database, wherein said usage errors database received a plurality of usage error data from the legacy system, and wherein said load function transfers the plurality of usage error data from the usage error database to the master database for processing, and wherein the strip function transfers corrected usage data from the master database to the corrected usage database, and wherein the corrected usage data is provided back to the legacy system for use in the bill for the metered service.

In another embodiment, the present invention comprises a method for processing and correcting errors in usage data on a system separate from the legacy systems used to record usage data and the generate bills for customers served by the service provider. By using system apart from the legacy system, the present invention provides much more flexibility for enacting special billing discounts in response to competitive pressures.

The present invention provides a graphical user interface with pre-defined and ad hoc query capabilities enabling users to locate particular error records or cases of error records.

The present invention comprises a master database running on a server, wherein the database comprises a plurality of pre-defined rules for processing and correcting errors in usage data meeting the criterion of one of the rules. After a rule has been applied to an error record, the record may be sent back to the legacy system for inclusion in the billing processes thereon.

An administrator graphical user interface is provided for managing users, rules, and transactions on the error processing system of the present invention. An administrator may approve, deny or delay processing on certain rules or transactions according to one or more threshold identifiers that the administrator may set up.

A reporting system is also provided by the present invention to provide users with a plurality of pre-defined and ad hoc reports. The reporting system may be accessed directly by users who can direct the format, content, and output device for the reports. Unlike prior legacy error processing systems, the present invention does not require extensive knowledge of the internal database structures to generate useful reports.

DESCRIPTION OF THE DRAWINGS

FIG. 6 is an exemplary view of a usage error overview screen provided to a user in an embodiment of the present invention.

FIG. 10 is an exemplary view of a usage display screen provided to a user in an embodiment of the present invention.

FIG. 11 is an exemplary view of a case summary screen provided to a user in an embodiment of the present invention.

FIG. 12 is an exemplary view of a usage grouping screen provided to a user in an embodiment of the present invention.

FIG. 14 is an exemplary view of a main screen provided to an administrator in an embodiment of the present invention.

FIG. 15 is an exemplary view of a transaction approval maintenance screen provided to an administrator in an embodiment of the present invention.

FIG. 16 is an exemplary view of a detail display screen provided to an administrator in an embodiment of the present invention.

FIG. 17 is an exemplary view of a report for User Transaction Report by Site/Employee with Comments.

FIG. 18 is an exemplary view of a report for User Transaction Report by Site/Employee with Comments and Case-Definitions.

FIG. 19 is an exemplary view of a report for BRAVO CATTS Usage—Charge NPA/NXX.

FIG. 20 is an exemplary view of a report for BRAVO CATTS Usage—Originating NPA/NXX.

FIG. 22 is an exemplary view of a report for Delete Summary Report.

FIG. 23 is an exemplary view of a report for Write-Off Summary Report.

FIG. 24 is an exemplary view of a report for Transmission Reports.

FIG. 25 is an exemplary view of a report for MOU 15-60-90 Report.

FIG. 26 is an exemplary view of a report for PEGS 15-60-90 Report.

FIG. 27 is an exemplary view of a report for Aging—DA vs. Other Report.

FIG. 28 is an exemplary view of a report for Transacted and Unworked Usage Other than IBIS Report.

FIG. 29 is an exemplary view of a report for Error Master File—MPB Report.

FIG. 30 is an exemplary view of a report for Usage Cases On Hold Report.

FIG. 31 is an exemplary view of a report for Aging Bill Guarantee IOS/72V Report.

FIG. 32 is an exemplary view of a report for Aging Bill Guarantee OTS/CABSTT Report.

DETAILED DESCRIPTION OF THE INVENTION

Figure 2A:
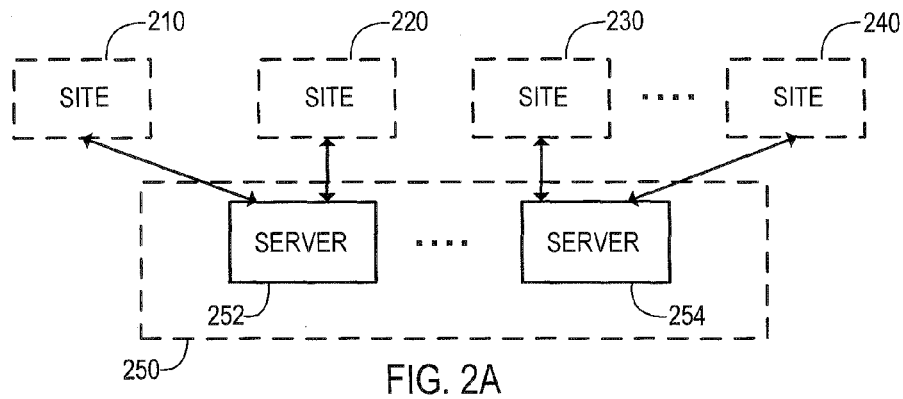
FIG. 2A is a schematic diagram showing systems for error processing and correction according to an embodiment of the present invention.

A schematic diagram showing the architecture for an embodiment of the error processing system of the present invention is shown in FIG. 2A. As shown in FIG. 2A, tracking and billing sites 210, 220, 230 and 240 feed data to site 250 for processing and correcting errors by one or more centralized server computers, e.g., server computers 252 or 254.

Figure 1A:
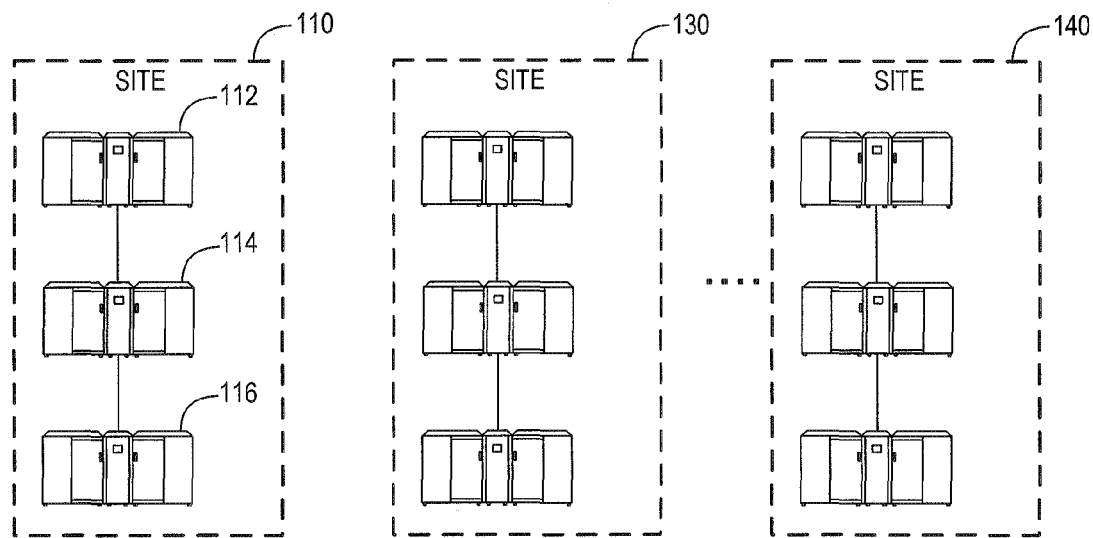
FIG. 1A is a schematic diagram showing systems engaged in error processing and correction using legacy systems.
Figure 1B:
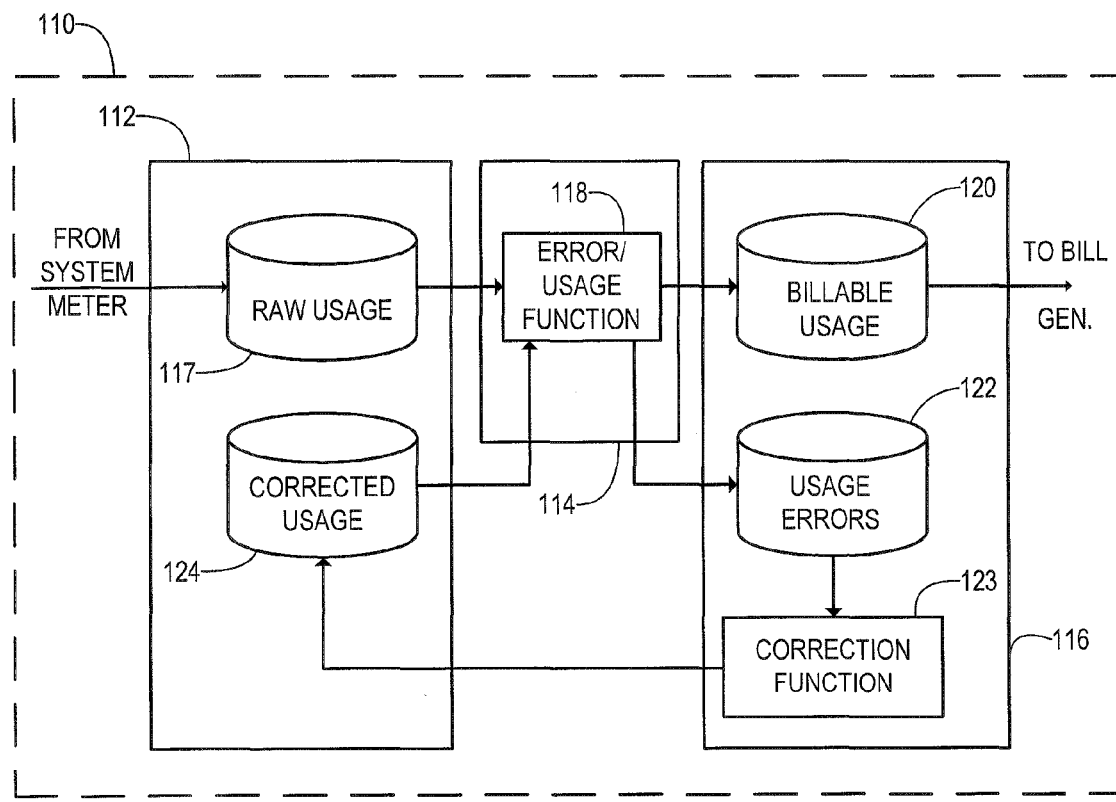
FIG. 1B is a more detailed schematic diagram showing the systems and functions performed at each site shown in FIG. 1B.
Figure 2B:
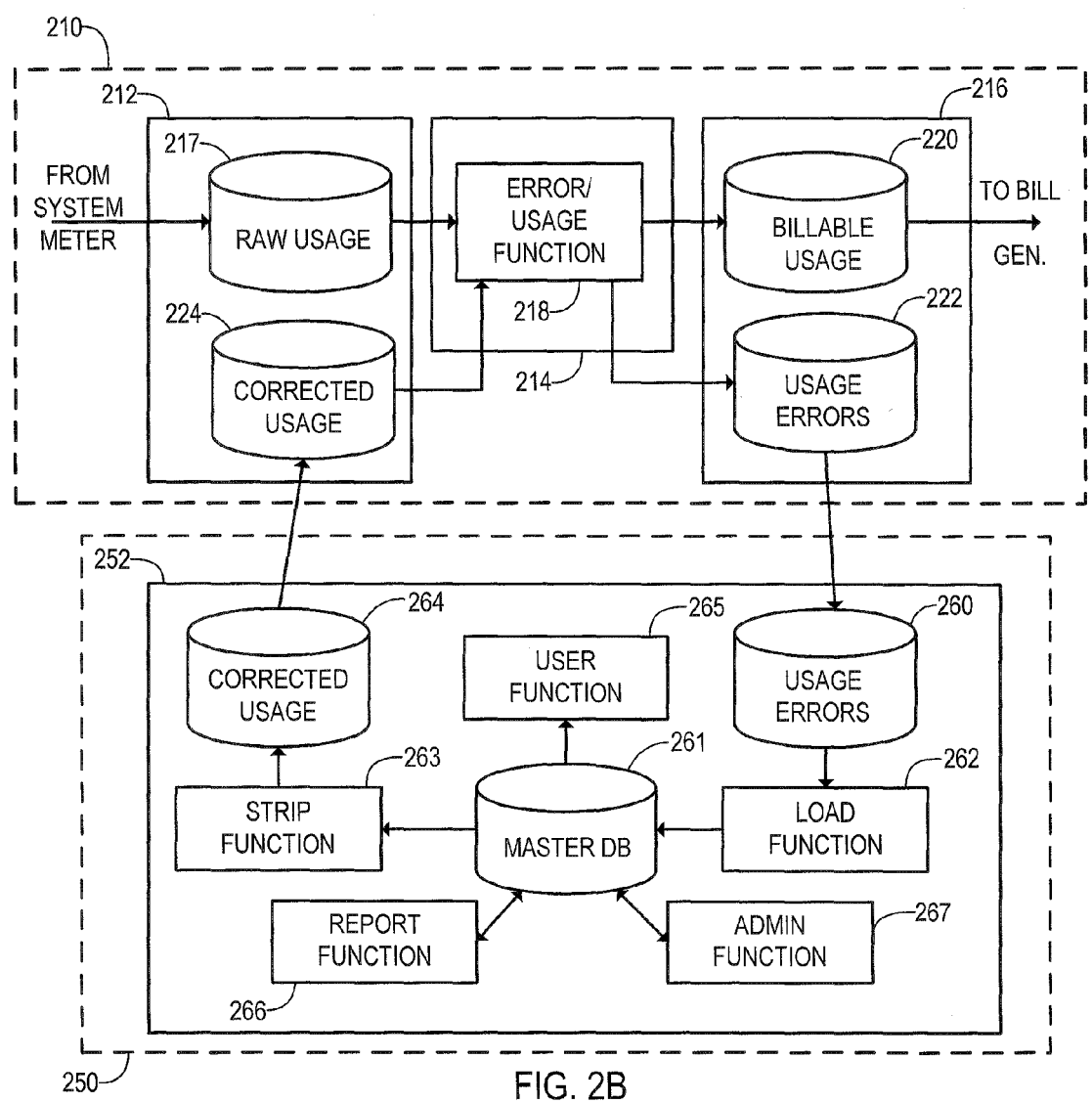
FIG. 2B is a more detailed schematic diagram showing the systems and functions performed by a server according to the present invention.

FIG. 2B is a more detailed schematic diagram showing how error processing and correction is handled in an embodiment of the present invention. The computer systems and databases shown at site 210 in FIG. 2B are the same as those shown at site 110 in FIGS. 1A and 1B. That is, computer 212 corresponds to computer 112, raw usage database 217 and corrected usage database 224 correspond to raw usage database 117 and corrected usage database 124, respectively. Similarly, computer 216 corresponds to computer 116, billable usage database 220 and usage errors database 222 correspond to raw usage database 120 and corrected usage database 122, respectively. Finally, computer 214 corresponds to computer 114 and error/usage function 218 corresponds to error/usage function 118. Note however, that computer 216 does not include a corresponding correction function 123 for correcting the data. Instead of locally processing and correcting errors in the data, the data is sent to a server computer 252 at a centralized site 250 for processing and correcting errors of the usage data. Server computer 252 may be any server computer suitable for receiving and processing data from the various tracking and billing sites. In an embodiment of the present invention, server computer 252 is a Windows NT server. As shown in FIG. 2A, data from more than one site may be processed by a single server computer. That is, server computer 252 may process data from both sites 210 and 220.

Usage errors from database 222 on computer system 216 are sent from site 210 to server computer 252 for storage in database 260. In an embodiment of the present invention, the usage errors are transmitted from each site to its designated server on a daily basis. This data is then loaded into master database 261 by load function 262. Master database 261 can be implemented using any relational database server application. In an embodiment of the present invention, master database 261 is a Microsoft SQL Server 7.0. Although a single server may process data from multiple sites, in a preferred embodiment, separate master databases are used to process the data. Accordingly, server computer 252 may include more than one master database. After the error data has been corrected, it is sent back to the local tracking and billing site from which it was received. In an embodiment of the present invention, a corrected error file is pulled from master database 261 on a daily basis by strip function 263. Strip function 263 conforms the data to an appropriate format and stores the corrected data in database 264. As shown in FIG. 2A, data from database 264 is then sent back to site 210 for entry back into the billing stream process.

The interface between the data and the users is provided via user function 265. In an embodiment of the present invention, user function 265 is a PC-based graphical user interface (GUI). Error correction according to the present invention can be applied to individual errors, as well as to cases or classes of errors wherein the user can define the characteristics of the case or class. The error processing system of the present invention is designed to handle all types of wholesale usage (for example, in the telecommunications industry, common legacy wholesale usage systems include CABS, MPB, UNE, PSP, Wireless, etc.).

In the error processing system of the present invention, report generation may be a user defined process. Report function 266 allows users to define reports, the frequency at which the reports are generated and the media on which the reports are to be produced. Report function 266 provides users with the ability to quickly determine the overall state of the error master file and provide comprehensive statistical information. Also, historical data may be maintained for a period of time, e.g., six months, providing the capability to recreate deleted usage as well as providing access to detailed information on the history of every message. Report function 266 thereby reduces the need for manual intervention by a system administrator to generate reports on behalf of users.

Administration function 267 may be used to control access to the error processing and correction system of the present invention. Administration function 267 is preferably a GUI application for ease of use. Administrator function 267 may also be used to grant or deny approval to correct certain errors as determined by parameters set up by administrators.

The present invention provides several advantages over conventional error correction systems. First, the present invention allows batch processing of errors. Second, the present invention provides the GUI environment noted above to allow easy access to system user. Third, the present invention includes the administrator function noted above to enhance security and general administration of the error correcting system. Finally, the present invention includes a reporting function that provides comprehensive access to the data being processed and corrected. Characteristics associated with each of these benefits are described in greater detail in the following sections.

1. Batch Processing Characteristics
   a. Rules

Rules can be set up in the error processing system of the present invention to transact usage automatically. A rule identifies usage by criteria and applies a transaction to the usage. For example, an administrator could set up a rule that would always release usage errors that came into the error processing system of the present invention having a specific identifying code or site ID, etc. In a preferred embodiment, only administrators can build rules in the error processing system of the present invention. Also in a preferred embodiment, rules include a description of the rule and have start and end dates that meet the following criteria:

Start Date: Cannot be earlier then current date and can be up to one month in the future.

End Date: Cannot be earlier than current date and can be up to one year in the future.

Maximum Duration: The maximum amount of time that a rule can be in effect is one year.

An administrator can view a screen showing all rules that are within a given time frame of expiring and those that have already expired. This screen also allows the administrator to extend, modify or delete rules.

A rule report is available to users and administrators through the GUI user function. This report displays all the rules that are defined in the error processing system of the present invention. This report shows how much usage has been transacted by each rule since it was added to the error processing system of the present invention, the date the rule was created, as well as the person who created.

When a rule expires, but has not been extended, modified or deleted, it will no longer perform action on the records that it applies to. Those records will flow through the normal load process. That is, if other unexpired rules are applicable, they will be applied to the records as necessary.

Changing the end date can extend a rule that has expired. However, a rule that has been deleted cannot be reused. An expired rule can be copied into a new rule, but it cannot be reused.

Cases and rules can be added or deleted at any time. When a case/rule is deleted, the error processing system of the present invention will attach a total messages and minutes of use (MOU) figure with it for historical purposes. A comment is required on a rule when it is created and when it is deleted. Deleted rules/cases are maintained as long as there is related usage in the system for historical and root cause analysis purposes.

b. Load Thresholds

System thresholds can be associated with each error code processed in the load process. If any of these thresholds is exceeded, an email can be sent to one or more administrators describing the threshold that was exceeded. The threshold values can be maintained by the administrators and can be modified as needed using the administrative screens. In a preferred embodiment, defined thresholds include:

Last Load All Sites Threshold: If the total number of records related to a particular error code loaded in the last load exceeds a defined value, this threshold is met. The last load all sites threshold include records received from all sites. A default value can be assigned for any error code that does not have a specific assigned value.

Last Five Loads All Sites Threshold: If the total number of records (all sites) for a particular error code loaded in the last five loads exceeds a defined value, this threshold is met.

Last Load Single Site Threshold: If the total number of records loaded in the last load for a single site exceeds a defined value, this threshold is met.

c. Notification Of Undefined Error Codes/Record Types

In a preferred embodiment, a warning email can be issued to administrators in certain situations. For example, a warning message may be sent when a record layout is received that is not defined for processing according to the present invention. In another example, a warning email mail be sent when an error code is detected that is not defined.

d. Case Processing

As noted, the error processing system of the present invention can assign new usage to existing cases, if the criteria match e. Transmission Statistics Transmission statistics may be stored in the error processing system of the present invention history for all loads and strips.

f. User Defined Criteria To Load Data To Files Instead Of GUI

Users can identify records that should not be loaded to the GUI for correction. These records are spun off to separate files and maintained for the designated retention period.

g. Handles Variable Length Records And Modules

The error processing system of the present invention can handle variable length records as well as modules attached to these records as long as they are defined in the record layout portion of the master database. Administrators can define new record layouts using the administration function.

h. Converts Data From EBCDIC to ASCII And Back

The error processing system of the present invention has logic that can convert data from EBCDIC to ASCII and back again.

i. Controls Included to Balance Between Sending And Receiving Programs

The error processing system of the present invention has controls in place to balance between sending and receiving programs from mainframe to server and back to mainframe. Any out of balance conditions can be sent via email to system administrators.

j. Groups Corrected Records and Sends Them to Appropriate Mainframe Site

One (or more) times per day, corrected records are pulled off of the error processing system of the present invention and put into a file that is then transmitted to the bill stream and mainframe site that it originated from. Users may also redirect usage to another bill stream or to some other site as desired. In a preferred embodiment, the transmission between server and mainframe is accomplished via Connect: Direct available from Unitech Systems, Naperville, Ill.

k. Moves Usage From One Site to Another

The error processing system of the present invention provides the capability of moving usage from one processing site to another processing site.

l. History

The error processing system of the present invention maintains history information on all usage that has been processed. By using the history information for a record or case of records, the original record can be seen and every transaction performed on that usage can be viewed, along with the comments entered.

m. Controls

Controls within the error processing system of the present invention can be used to insure data integrity through internal and external balancing; and restricted system access. System access can be restricted using network security features such as those provided by NOVEL or Windows NT network operating systems and third-party virus or intrusion detection systems. Access may also be restricted through user security features built into the applications comprising the present invention.

External Balancing—External balancing may be used to insure all records generated by one system are transmitted successfully across platform boundaries to a receiving system. Such balancing insures data is not lost or duplicated in the transmission process. In a preferred embodiment, the error processing system of the present invention uses products available from Unitech Systems, Naperville, Ill., for external balancing. This balancing takes place during the transmission of data from the mainframe to the server and from the server to the mainframe. External out of balance conditions cause the mainframe job to end and an email message can be used to alert the system administrators.

Internal Balancing—Internal balance procedures can be used to insure the database is not corrupted through the duplication or omission of usage. Balancing occurs whenever usage is added to or stripped off any of the databases used by the present invention. In a preferred embodiment, internal load balancing is performed using Unitech Summary, available from Unitech Systems, Naperville, Ill. Internal out of balance conditions can be reported to system administrators via email.

System Access—In an embodiment of the present invention, access to the error processing system data can be controlled through the use of four levels of security. The first level, the network operating system, e.g., Novell, limits users to those individuals defined to Novell. This places control over who can access the network, which servers within the network can be seen and what directories can be updated. The second level, system security is provided by setting up the server computer to allow limited access. In a preferred embodiment only system administrators or other trusted users are allowed direct access to the applications and data on the server computer. In this embodiment, regular users may access the databases only through the application. Further, the server system may be set up to send email, but not to receive email or any transmissions except through the application. This feature eliminates any threat of corruption by a virus or other malicious threats. The third level, SQL Server security provides the primary protection of the databases within the error processing system of the present invention. In order for an individual to have any access to the error processing system of the present invention, they must be identified to SQL Server as a user and their 'rights' to the database defined. The fourth level, the application security features, requires that a user be defined within the system with the type of access needed, e.g., Read Only, Update and Administrator.

2. User GUI Characteristics a. Sign-On Screen

The user GUI provides a sign-on screen which is used to control access to the system as described above. Users enter a user ID and a password to log in and gain access.

b. Presentation of Errors (Error Code Tree)

Usage data is displayed via the GUI using a hierarchy to simplify data analysis for the users. The hierarchy, also known as an error code tree allows users to zero-in on the pertinent information needed to analyze particular errors. In a preferred embodiment, the display hierarchy includes the levels show in Table 1.

TABLE 1

| Level | Item |
|---|---|
| 1 | Site (the usage was received from) |
| 2 | Type of Usage (such as UNE, CABS access, MPB, etc.) |
| 3 | Type of Error (Format, Reference, Guide, other) |
| 4 | Error Code (screen layout defined by the user) |
| 5 | Current Cases (Cases not on hold) |
| 6 | Cases on Hold |
| 7 | Other |

Also, in a preferred embodiment, the error code tree can be visually enhanced by adding interactive features such as displaying a brief description of that error code when the cursor is floated over an error code on the tree.

c. Summary Screen

Once the user logs on to the system, a summary screen is displayed providing statistics about the error database for that site. The summary screen displays records, messages, MOU, Pegs and date range at the error code level. The screen may also provide this information (by error code) for usage that is unworked (not transacted), transacted and usage that came into system on the last load. A grand total line for the entire error database may also be displayed on the summary screen. The date and time of the last load for that site may also be displayed on the summary screen.

d. Usage Error Overview

When the user clicks on a particular error code, the GUI provides a summary screen for that error code. The summary screen contains records, messages, MOU, Pegs and date ranges for Current usage, Usage on Hold, Transacted usage and Other usage for that error code.

e. Grouping Screen

The GUI can provide many options for grouping usage 'as you go' on the error grid. For example the grouping screen may include features to: add or remove fields on the error grid; filter records based on message date range; view only usage that has come in on the last five cycles; change the order the records are displayed; populate specific values in fields and only view records that match that criteria; look for specific record types; and to save groupings defined for each error code.

f. Error Grid

Users may define what information is displayed on the error grid, including the order of display for each error code. The errors having a particular error code (either as part of a user defined 'case' or not) are summarized and displayed according to that definition. The definition (per error code) can be changed during daily processing to change the presentation of the data. Administrators can create, change and delete error code display definitions via the administrator GUI screen.

g. Cases

Cases are records that are grouped together because they meet a certain criteria. Normally, usage that is grouped together in a case represents one problem. When that problem in resolved, all of the usage in the corresponding case can be sent to bill. User cases can be set up at the error code level. Per error code, usage that falls within a defined case is displayed with that case on the GUI screen. Usage that does not fall within any case, will be displayed as 'Other' within that error code.

User cases may be built using any suitable process. In an embodiment of the present invention, user cases may be built using user function 265.

h. Detail Screen

The error processing system of the present invention allows display of each record in error at a detail level. While investigating usage, the user can double click on a line in the error code display grid and go to the detail information screen. This screen shows all fields for the first 50 records contained in that group of usage on the selected grid line. On the detail screen, each record's unique record ID number is displayed. The record ID can be entered in the search input box which will then display only that record for investigative purposes.

i. Case Summary Screen

An embodiment of the present invention may also include a case summary screen including information such as: error code; case number; case description; total messages; total MOU; date the case was created; start and end date of the usage in the case; date that usage was last added to this case; and the user who created the case.

Using the case summary screen, a user may view a default display showing only cases created by the user that is logged in, or may view a display of all cases, regardless of who created it. The user may sort the records displayed based on error code, case description, user, messages, MOU, dates, etc. The user may display cases based on selected criteria. For example, the user may display all active cases, only cases that contain usage, only cases with no usage on them, only cases created by users, or only cases created by administrators. The summary screen allows the user to input other criteria, such as IBIS number, trouble ticket number or work request number and display all cases related to that input.

j. Transactions

Transactions are used to change usage on the error processing system of the present invention. Transactions include, e.g., delete; write off (WO); release and change. In an embodiment of the present invention, transactions can be performed by rules set up to automatically transact usage as it comes into the error processing system. Alternatively, cases of usage can be built on an ad hoc basis and transacted via the user GUI.

k. Pending Transactions

There is a screen on the GUI showing all pending transactions (transactions that have been entered that day). This screen includes transactions entered by the users through the GUI and transactions generated by rules. There is an option on this screen to delete any transactions that the user created and later decides not to process.

l. Comments

Comments can be entered at the case level to indicate the status of a particular case and what action has been taken on it. When entering a comment, the user selects a standard comment and also has the ability to put in additional information as an explanation. Multiple comments can be entered for a case. Comments are used to document IBIS cases sent, trouble tickets, work requests, etc. that are associated with that group of usage. When a user enters a transaction, a comment is required.

On the GUI, if the user clicks on a case, the comment, or multiple comments are displayed. The most recent comment is displayed first, with any other comments following it. The Comment fields that are displayed include: Date/Time the Comment was added, Comment Type, Comment freeform, User that entered comment. Cases can be pulled up on the GUI by entering an IBIS number, trouble ticket number, or work request number that was entered as part of a comment.

m. Approval Thresholds

Different transactions can have thresholds set up in the error processing system of the present invention to identify transactions that require administrator approval. In a preferred embodiment, approval thresholds include those shown in Table 2.

TABLE 2

| Threshold | Criteria |
| --- | --- |
| Delete | Group of records > 25 messages OR > 100 MOU |
| Write Off | Group of records > 6,500 messages OR > 20,000 MOU |
| Release or Change: | Group of Records that is > 31 days old AND (>40,000 MOU OR 13,000 MSGS) |

If a threshold is met, the user receives a message box when they are completing the transaction telling them that a threshold has been exceeded. Daily, before the transactions are pulled, the supervisor views a 'Transactions Requiring Approval' screen listing all activity for that day requiring administrator approval. In a preferred embodiment, this screen includes comments, case ID, case description, error code, name of person performing the transaction, MOU, messages and date of transaction and date range of usage. Further, if a line on this screen represents a change transaction, the screen offers the capability to view one record on that transaction to see what fields were changed and the new value for those fields.

The administrator viewing the 'Transactions Requiring Approval' may approve the transaction, allowing the transaction to be included in the records to be sent back to the mainframe. The administrator may also disapprove the transaction which will delete the transaction, preventing its transmission back to the mainframe. Finally, the administrator may choose to do nothing which leaves the transaction in pending status.

These thresholds are maintained in a table on the error processing system of the present invention. Administrators can change the defined thresholds through an administrative screen.

3. Administrator GUI Characteristics

The administrator GUI provides a simple interface allowing administrators to manage the error processing system of the present invention. An administrator can be any user having administrator permission on the system. For example, an administrator may be a supervisor or other person responsible for making decisions concerning how to handle special cases that arise in the error correction process.

a. Case Definition

Cases and rules can be viewed, edited, added and deleted via the Administrator GUI. Further, cases and rules can be tested before being saved to ensure that they do not result in erroneous transactions.

b. Transaction Approval

As described above, when certain thresholds have been reached, a transaction may require administrator approval. The administrator may list transactions waiting for approval for all sites. The administrator can choose to view transactions by site, and either list all transactions for a site or only those waiting for approval. Transactions generated by rules can also be displayed. The administrator can approve, reject or postpone action on transactions as described above.

c. Threshold Definition

The administrator GUI provides a screen to allow the administrator to define thresholds for the system. This screen allows the administrator to view, change, add or delete both balancing and approval thresholds, described above.

d. Record Layout Definitions

The administrator GUI provides a screen for displaying record layouts and field definitions. The administrator view, change, add or delete record layout via this screen. Further, fields on a layout can be linked to search fields.

e. Error Code Definition

Error codes can be viewed, changed, added or deleted via the administrator GUI.

f. Access Permissions

An administrator can also manage the access permission granted to other users of the system In an embodiment of the present invention, there are four levels of access permissions:

No Access permission means a user cannot even log on to the error processing system of the present invention.

Browse access permission allows a user to view the data in the error processing system of the present invention, but perform no action.

Update access permission allows a user to view data, enter cases, correct errors, build and run queries, etc.

Administrator access permission allows a user to approve/delete transactions, build rules and cases, add new error codes, define record layouts, etc.

Using an access permission screen, an administrator can display, change, add and delete users and their permissions within the system.

g. Field Definitions

In a preferred embodiment, there are at least two indicators associated with every field in the error processing system of the present invention. One indicator identifies whether or not a field may be updated at all and the other indicator identifies whether or not such updates require administrator approval or access permission before being implemented. These indicators can be updated by the users with the administrator GUI.

4. Reporting Characteristics a. Reporter

The error processing system of the present invention reporter gives end users the ability to run pre-defined reports with great flexibility by allowing many report parameters to be input by the user when requesting a report. Reports can be viewed online or sent to a printer. There is also an option to allow critical reports to be batch processed for automated report creation.

b. Ad Hoc Query Capability

For advanced users who have SQL experience, the capability to write and execute queries using standard SQL commands is available. This provides the highest degree of flexibility possible.

c. End of Month Processing

A monthly data feed to FDB provides financial information about the value of any usage that was written off during the month. Data is also provided reflecting the value of unworked usage that resides in the error processing system of the present invention. The value provided is approximate because, after the usage has been transacted, some of it may not be billable. Accordingly, the actual value of unworked usage cannot be determined until after the usage is investigated and processed.

Specific Embodiment of the Present Invention: Bravo

In the sections below, a specific embodiment of the present invention is described. This embodiment is used for error processing in support of a telecommunications provider. The embodiment described is known as the BellSouth Industrial Billing Reject and Verification Online (BRAVO) application.

The BRAVO error processing system is a client/server based PC application supported by SQL Server databases. The goal of BRAVO is to provide increased functionality, flexibility and reliability of error processing at a much lower cost. BRAVO relocates error data to NT servers and gives the error processing assistants access to this data using a user-defined PC based GUI screens developed in Visual Basic.

A. BRAVO User GUI

1. GUI Features

Figure 3:
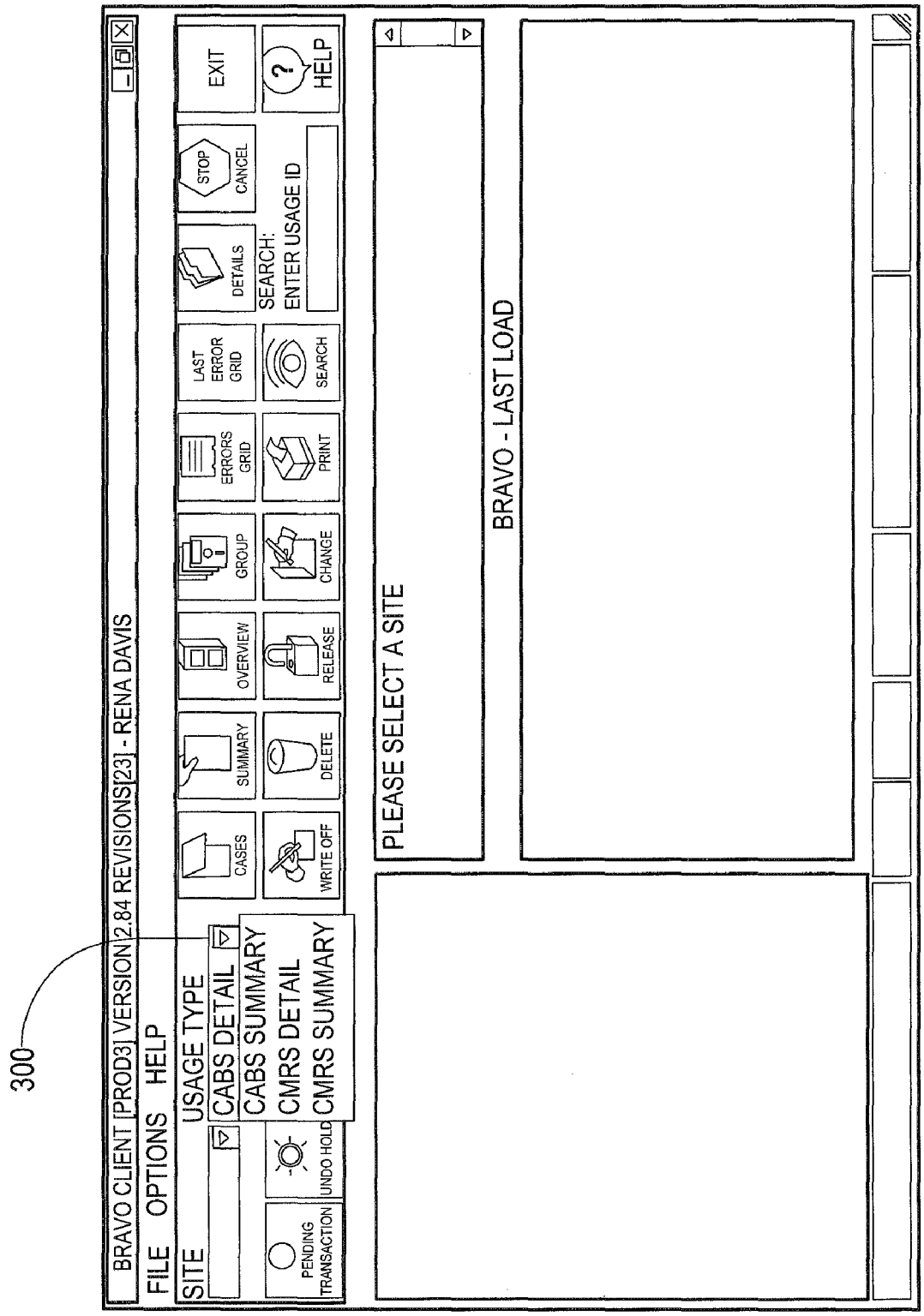
FIG. 3 is an exemplary view of an initial screen provided to a user in an embodiment of the present invention.
Figure 4:
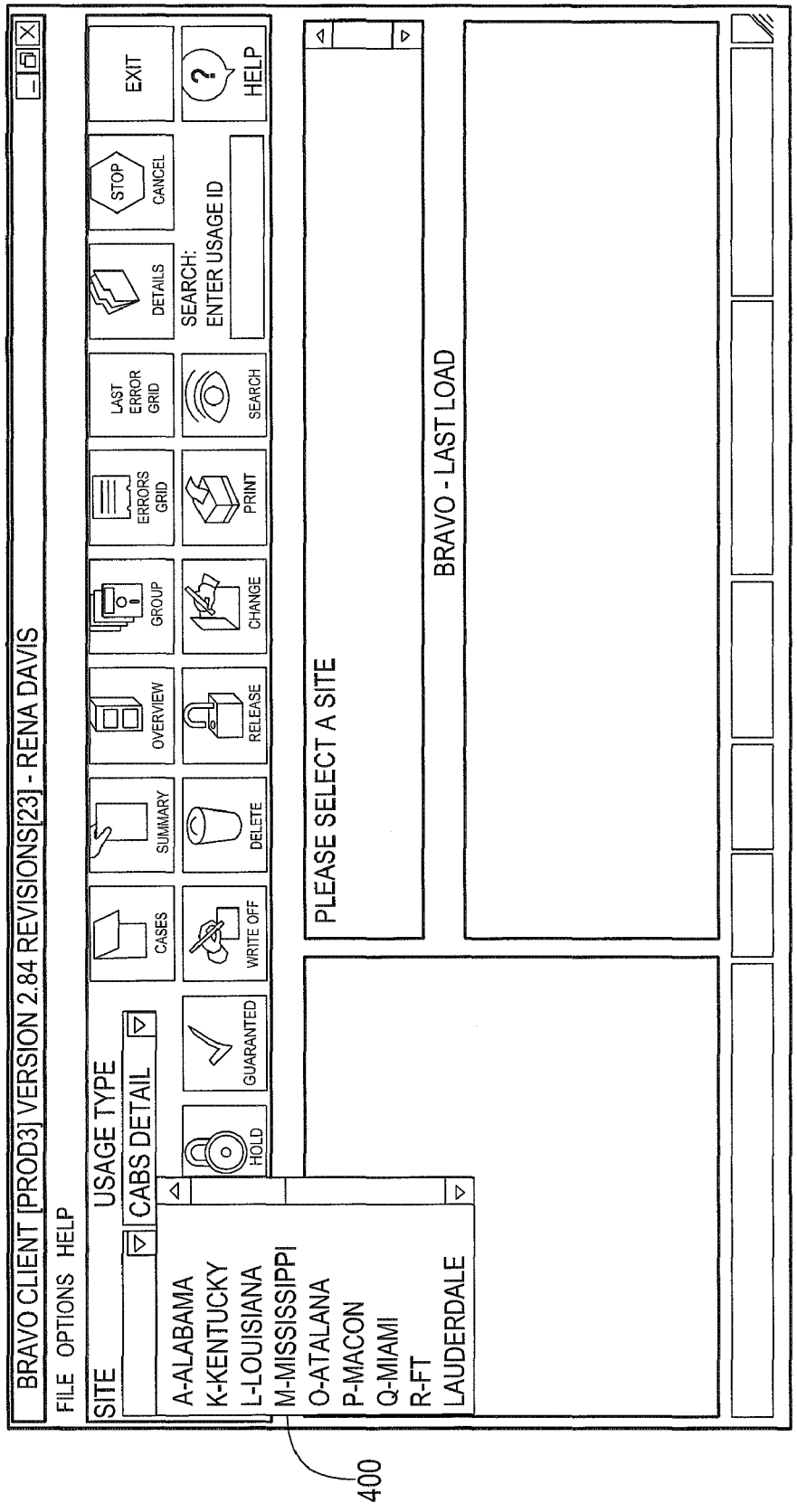
FIG. 4 is an exemplary view of the initial screen provided to a user in an embodiment of the present invention, wherein the user is selecting a site from a drop-down menu.
Figure 5:
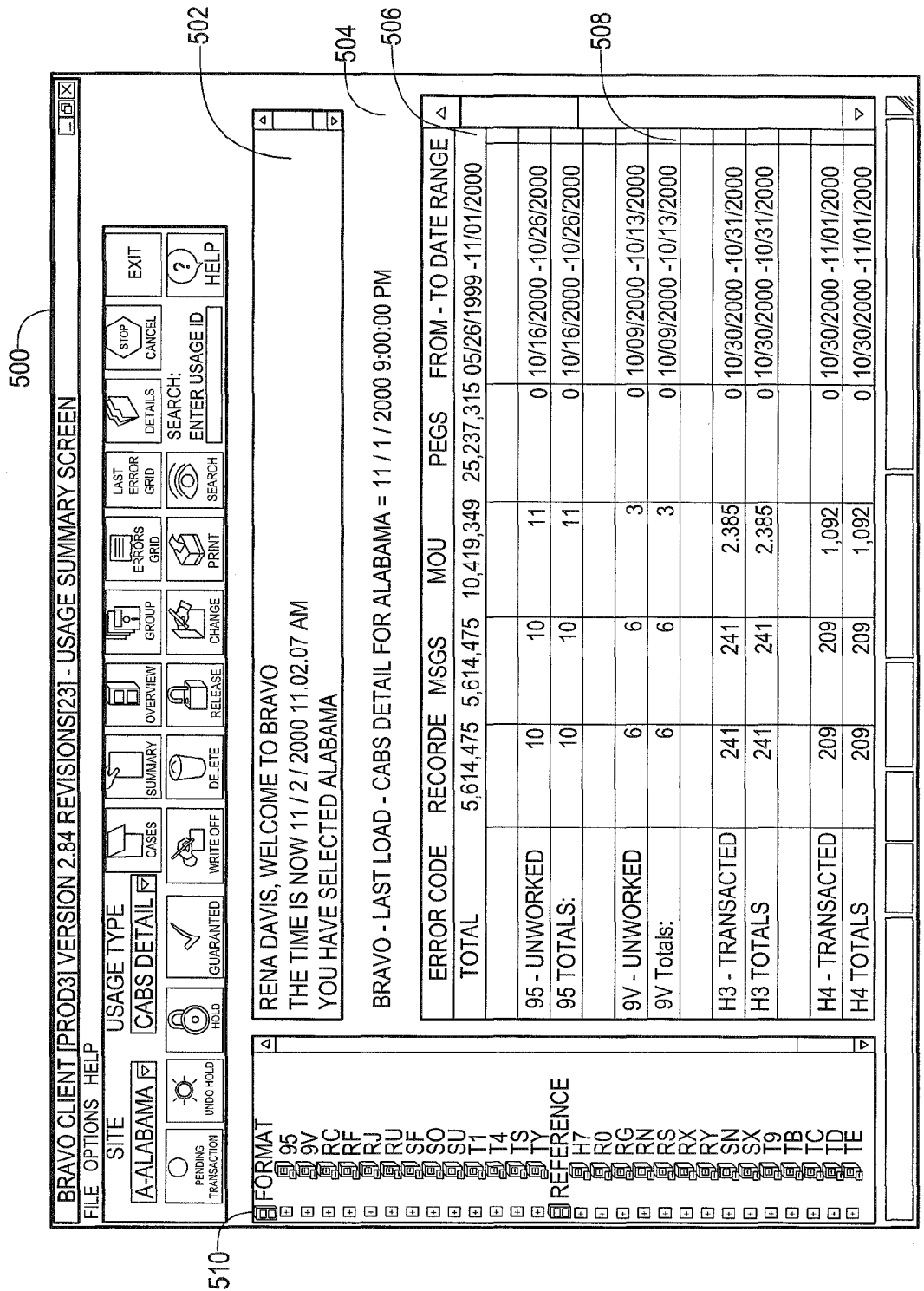
FIG. 5 is an exemplary view of a usage summary screen provided to a user in an embodiment of the present invention.

The BRAVO application user GUI provides a simple interface to the error processing system shown in this embodiment. FIG. 3 shows an example of the initial user screen presented to users of the BRAVO application after successfully logging into the system. The user may click on drop down box 300 to select a usage type. Examples of usage types include: CABS Detail, CABS Summary (i.e., Meet Point Billing (MPB)), CMRS Detail, and CMRS Summary. The user may also click on drop down box 400 to select a specific site, as shown in FIG. 4. After site and usage type are selected, usage summary screen 500 is displayed as shown in FIG. 5.

The right half of usage summary screen 500 includes several items of interest: information area 502 which includes the user's name, time and date, and site selected; last load data 504, which includes the date and time the last BRAVO load occurred; grand totals 506 for usage errors which includes data fields as shown in Table 3; and individual error code status 508 which includes totals for new, unworked, transacted, and grand totals as shown in Table 4. All of these totals can be categorized by record count, message count, MOU count, peg count, and date range.

TABLE 3

| Total Fields | Description |
| --- | --- |
| Records | Total number of records on the error file |
| Msgs | Same as Records for detail usage |
| MOU | Minutes of Use total |
| Pegs | Total number of peg counts on the error file. Peg counts are associated with query type records, like LIDB – FGL, IOS-FGS, 800 Database, SCP Query billing, etc. |
| From-To Date Range | From and To dates of the usage on the error file |

TABLE 4

| Error Code Status | Description |
| --- | --- |
| New | New error records from last load for BRAVO |
| Unworked | Existing error records that have not been worked (transacted) prior to the last load for BRAVO |
| Transacted | Error records that have been worked (transacted) but not yet pulled for the day |
| Totals | Total usage for individual error codes |

The left side of usage summary screen 500 shows error code tree 510. Error code tree 510 groups errors by specific error type. Error types include format errors (e.g., failed edits such as 'must be numeric' or must be 0 or 1, etc.), reference errors (e.g., errors related to reference files, such as the CEO file, IBIS file, etc.) and guide errors (e.g., error where the usage cannot guide to an account).

Figure 6:
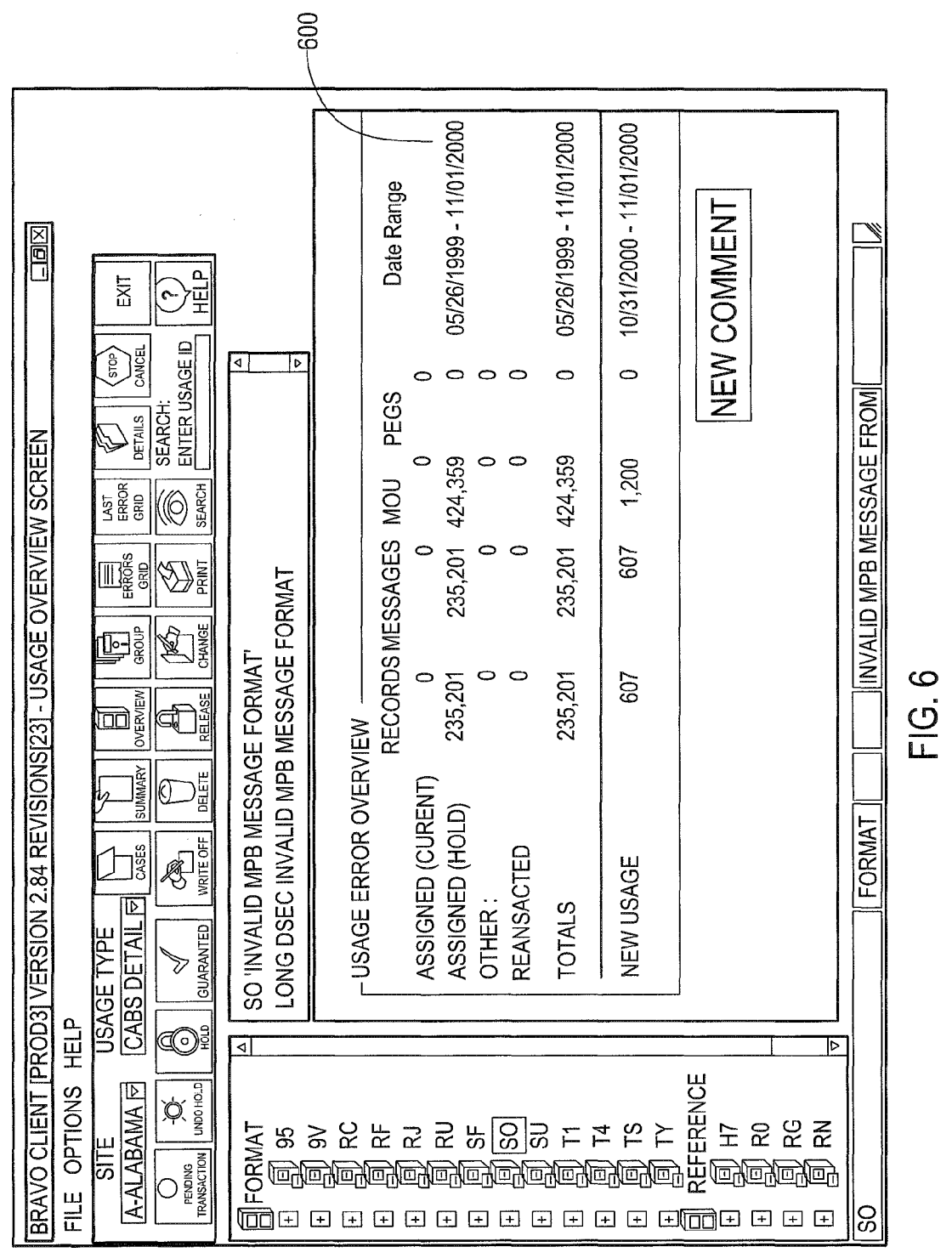

When a user moves the cursor over an error code, the cursor changes to a hand with a pointing index finger indicating a link to another screen. In addition, a message is displayed showing a brief description of the error code. When the user single-clicks on the error code, the right side of summary screen 500 changes to display an overview of this specific error code. Usage error overview screen 600 (shown in FIG. 6) includes a brief description of the error code. Usage error overview screen 600 may also include a more detailed description of the error condition. Usage error overview screen 600 displays a matrix showing the status of error records for this particular code.

Figure 7:
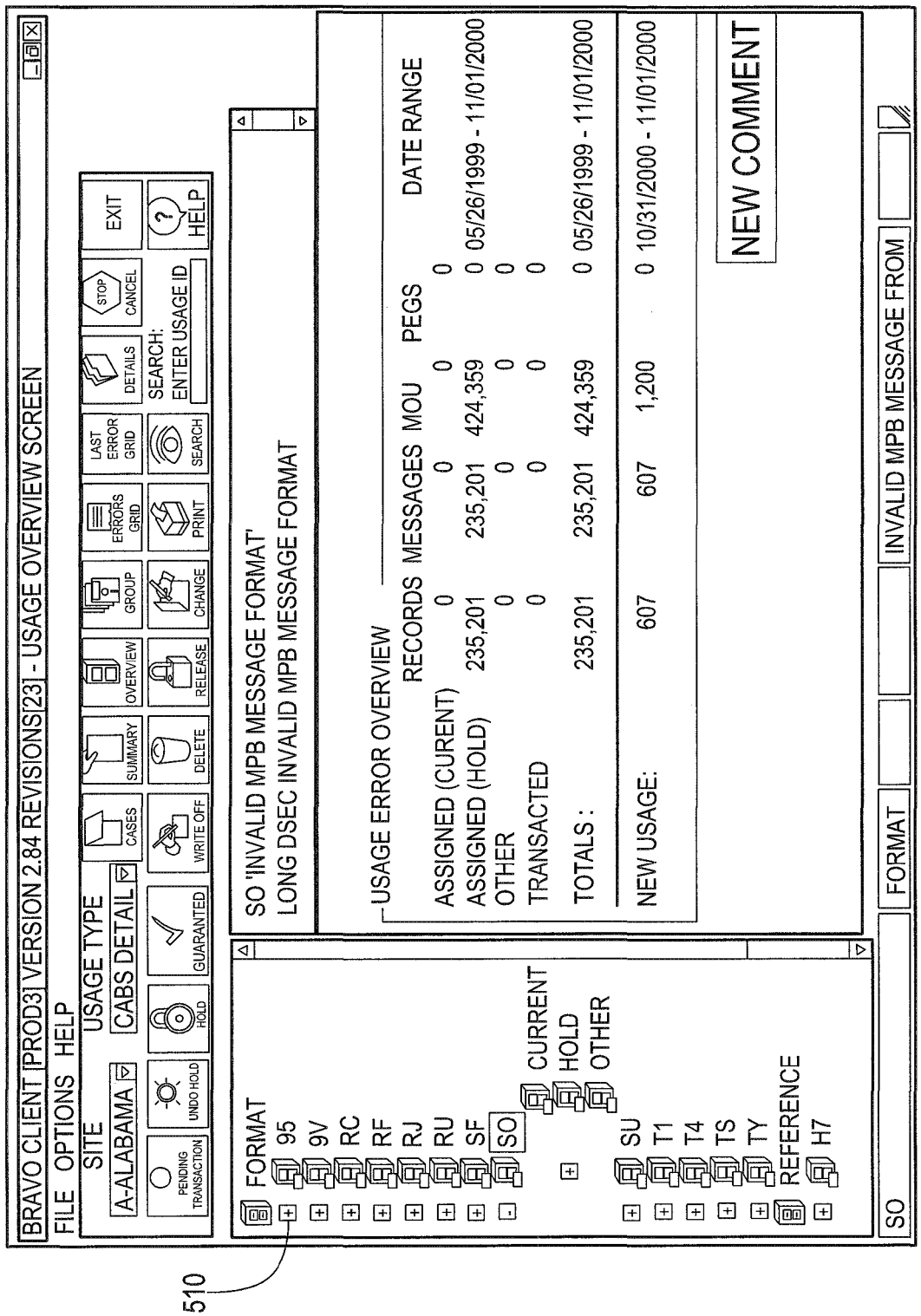
FIG. 7 is an exemplary view of a usage summary screen provided to a user in an embodiment of the present invention wherein the user has expanded the error code tree.

In addition to the error usage overview, the user may obtain additional information concerning the error code by expanding error code tree 510 for the code as shown in FIG. 7. That is, the user may open the error code by a single click on a plus (+) sign next to an error code in error code tree 510, or a double-click on the file folder/cabinet or error code shown in the tree. When the error code is opened, several file cabinets are displayed, as shown in FIG. 7 for the error code 'SO.' The file cabinets provide a grouping of the records according to the categories shown in Table 5.

TABLE 5

| Category | Description |
| --- | --- |
| Current | Displays a list of cases built by Administrators that are not on Hold |
| Hold | Displays a list of cases that have been built and put on Hold |
| Other | Displays a list of usage that has not been transacted or put into a Hold case (similar to the ARIES PF2 Scoped Screen) |

Figure 8:
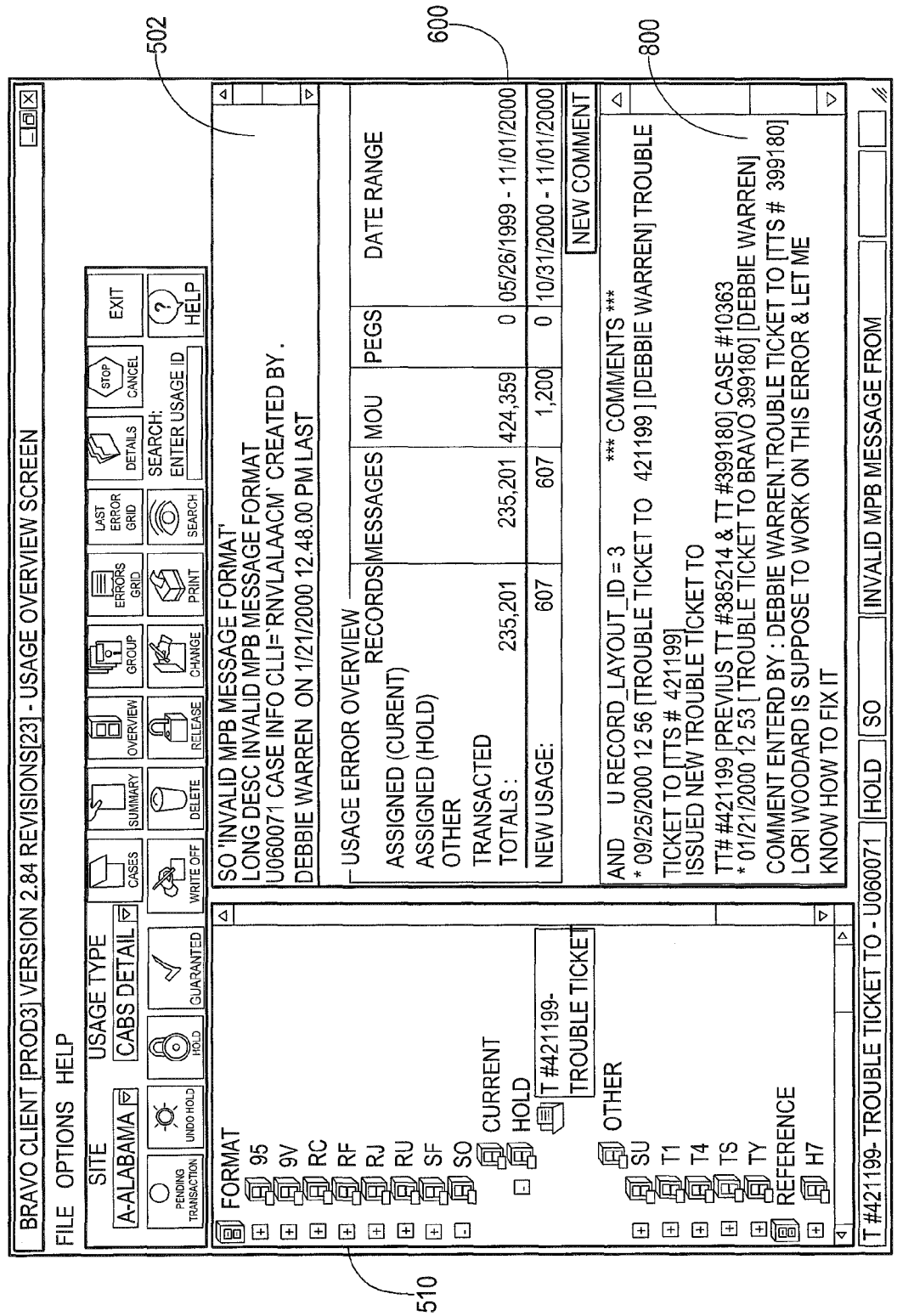
FIG. 8 is an exemplary view of a usage summary screen provided to a user in an embodiment of the present invention wherein the user has further expanded the error code tree.

Single clicking on one of the cabinets reveals more information related to errors in the particular category selected. This additional information is displayed in usage error overview screen 512 on the right side of the screen. After further expanding error tree 510 (e.g., by double-clicking on a file cabinet) additional file folders are displayed, as shown in FIG. 8. Additionally, single clicking the plus sign (or double-clicking the folder) displays the additional data in the folder, as shown in FIG. 8. The information in the folder will contain entries/cases for that particular error code. The bottom line of the screen will show the error code selected, what type of error it is (Format, Reference, or Guide), and a short description of the error code. Single clicking on the individual error case displays information about that case in the information area 502 and in the detail area 800 (below the usage error overview area 600) as shown in FIG. 8.

Each error record is assigned a unique case number which begins with either 'U' for user case, 'A' for an administrator case, or 'R' if a case is generated from a Rule. The bottom line of the screen changes to show the case identity, what category of error it is (Current, Hold, or Other), the number of comments, in addition to the error code selected and a short description of the error code.

The individual entries under the 'Hold Folder' have status codes assigned to them based on the reason an error record is being held as indicated in Table 6.

TABLE 6

| Status Code | Description |
| --- | --- |
| C | Error is pending a CEO File update |
| | The NPA/NXX that needs updating on the CEO File is displayed in the number field |
| I | IBIS Case has been issued for further investigation by another department |
| | The case number is displayed in the number field |
| T | TTS trouble ticket has been issued for further investigation by the Information Technology (IT) group |
| | The trouble ticket number is displayed in the number field |
| F | Referred to a Subject Matter Expert (SME) for further investigation |
| W | Work Request was entered |
| | The Work Request number is displayed in the number field |
| Other | Other was entered as comment |
| | 'Other' is displayed in the status code and number field |

Figure 9:
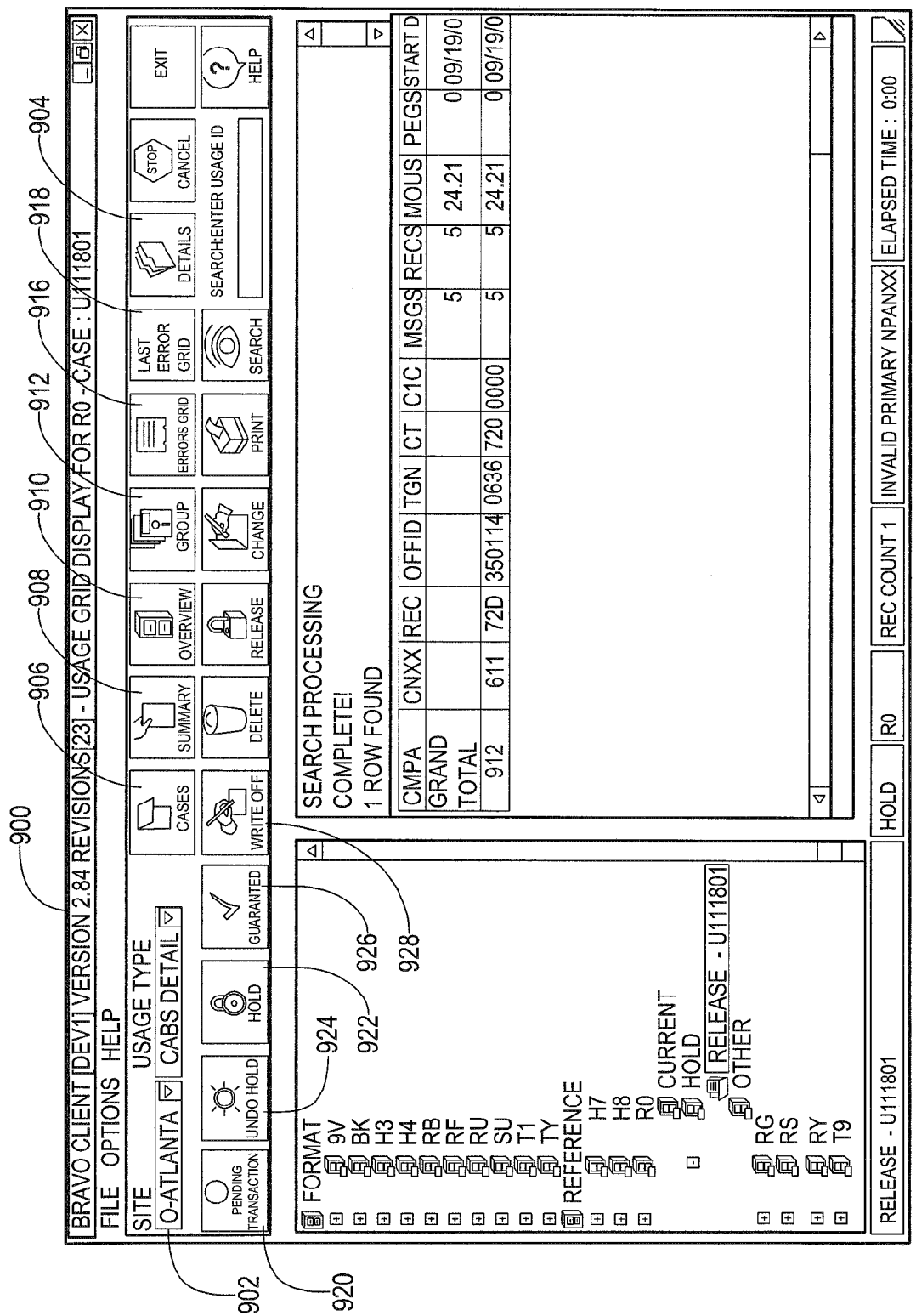
FIG. 9 is an exemplary view of a usage grid display screen provided to a user in an embodiment of the present invention.

When the individual error record is double-clicked, the title at the top of the screen changes to: USAGE GRID DISPLAY FOR <Error Code> - Case: XXXXXXX - <Status Code> <Number>, as shown in FIG. 9. This is also referred to as the Error Grid. The case associated with the record will be displayed on the right hand side of the screen. The scroll bars in the window allows the movement for viewing the information from side to side and up or down.

Usage grid display 900, shown in FIG. 9 includes selection area 902 containing buttons used to perform specific functions when viewing or updating error records. Certain buttons in selection area 902 are highlighted only when an individual error record is activated. These button include: Overview; Group; Errors Grid; Details; UNDO Hold; Hold; Guarantee; Write Off; Delete. Release; and Change. The function of these and other buttons are described in greater detail below.

Details Button: Double-clicking on a particular record or highlighting and single clicking the details button 904 changes the view to the usage display screen shown in FIG. 10. Specific cases can be located by clicking the arrows at the bottom of the screen or by entering the case number in the search data box. An occurrence on the error grid may have multiple records. To move from record to record, the user can press the arrows in the lower bottom section of the usage display screen in FIG. 10.

Figure 11:
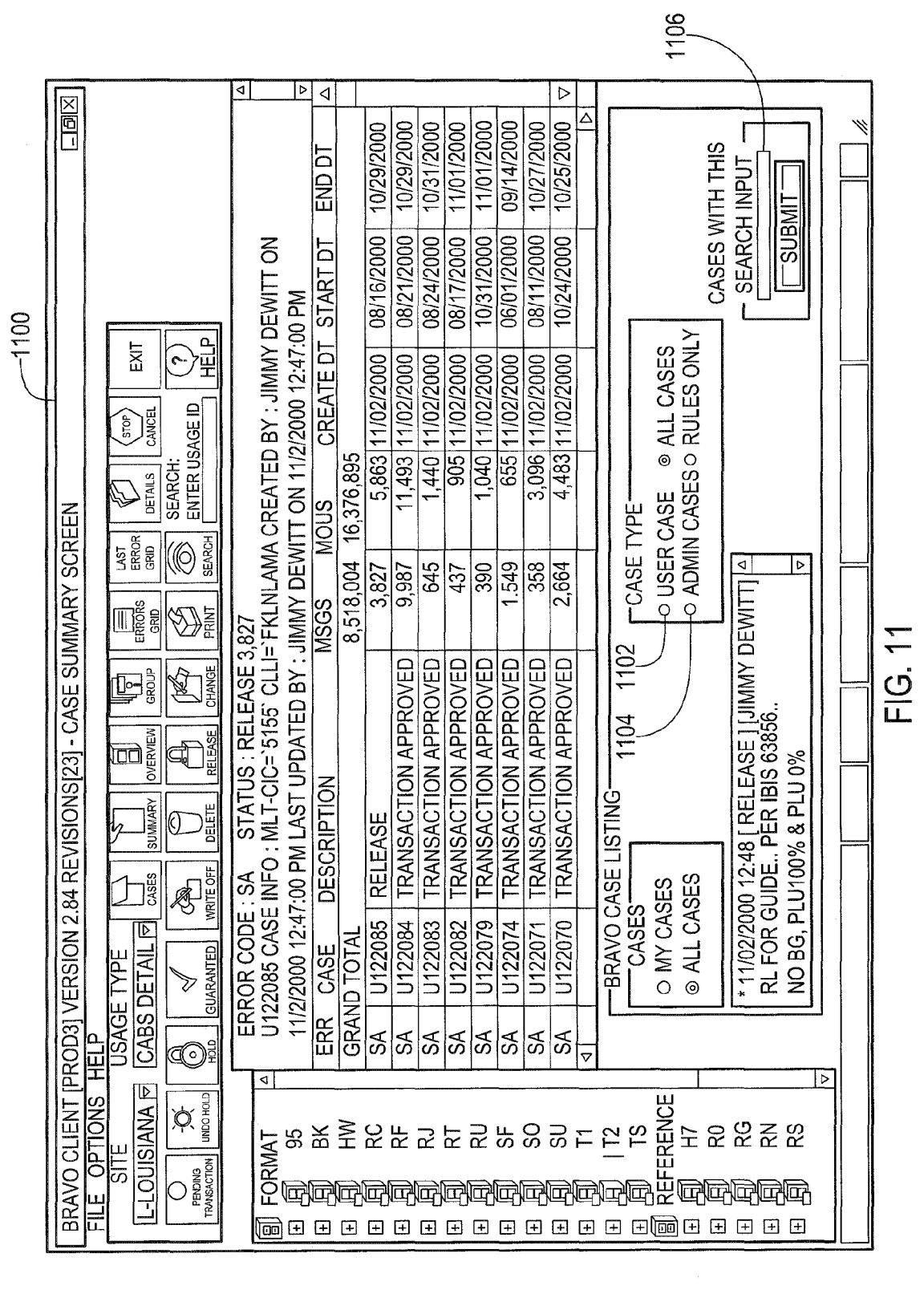

Cases Button: The cases button 906 allows the user to display the BRAVO case listings as shown in FIG. 11. Case summary screen 1100 provides the user a set of pre-defined options which may be used to select cases by case creator and case type. For example, to select administrator cases or cases built by rules only, a user can select button 1102 or 1104 on case summary screen 1100. Alternatively, the user may input other selection criteria in input box 1106. Example of other selection criteria includes the categories shown in Table 7.

TABLE 7

| Category | Options |
| --- | --- |
| Cases | My Cases |
| | All Cases |
| Case Type | User Case |
| | Admin Cases |
| Hold Status | Cases On Hold |
| | Cases NOT On Hold |
| | Both |

TABLE 7-continued

| Category | Options |
|---|---|
| Usage | With Usage |
| | Without Usage |
| Cases With This Search | Used for an item that has been entered in the Comment input fields. |
| Input | Includes IBIS number, NPA/NXX on a Pending CEO File change, Work Request number, or Trouble Ticket number |

By default, only cases that have usage associated with them will appear on error code tree 510. If the 'Without Usage' criterion is selected, the transaction cases displayed will be from the last five days in which no new usage is received. This means every time a transaction is created, BRAVO builds a case. For five days, BRAVO keeps track of this case so that if any usage comes in that meets the same criterion, it will combine it with that case. If for five days, no new usage comes in meeting that criterion, then the case can be deleted automatically.

A record cannot be changed, released, or deleted when in this mode. To make such changes in a BRAVO case the user must be on usage grid display screen 900.

Summary Button: The summary button 908 (on FIG. 9) recalls the usage summary screen 500 as shown in FIG. 5. This button may be useful when there is a need to review the volume of error codes.

Overview Button: The overview button 910 displays a usage overview screen similar to the one shown in FIG. 6. The error code being viewed is displayed in the lower left corner of the screen.

Figure 12:
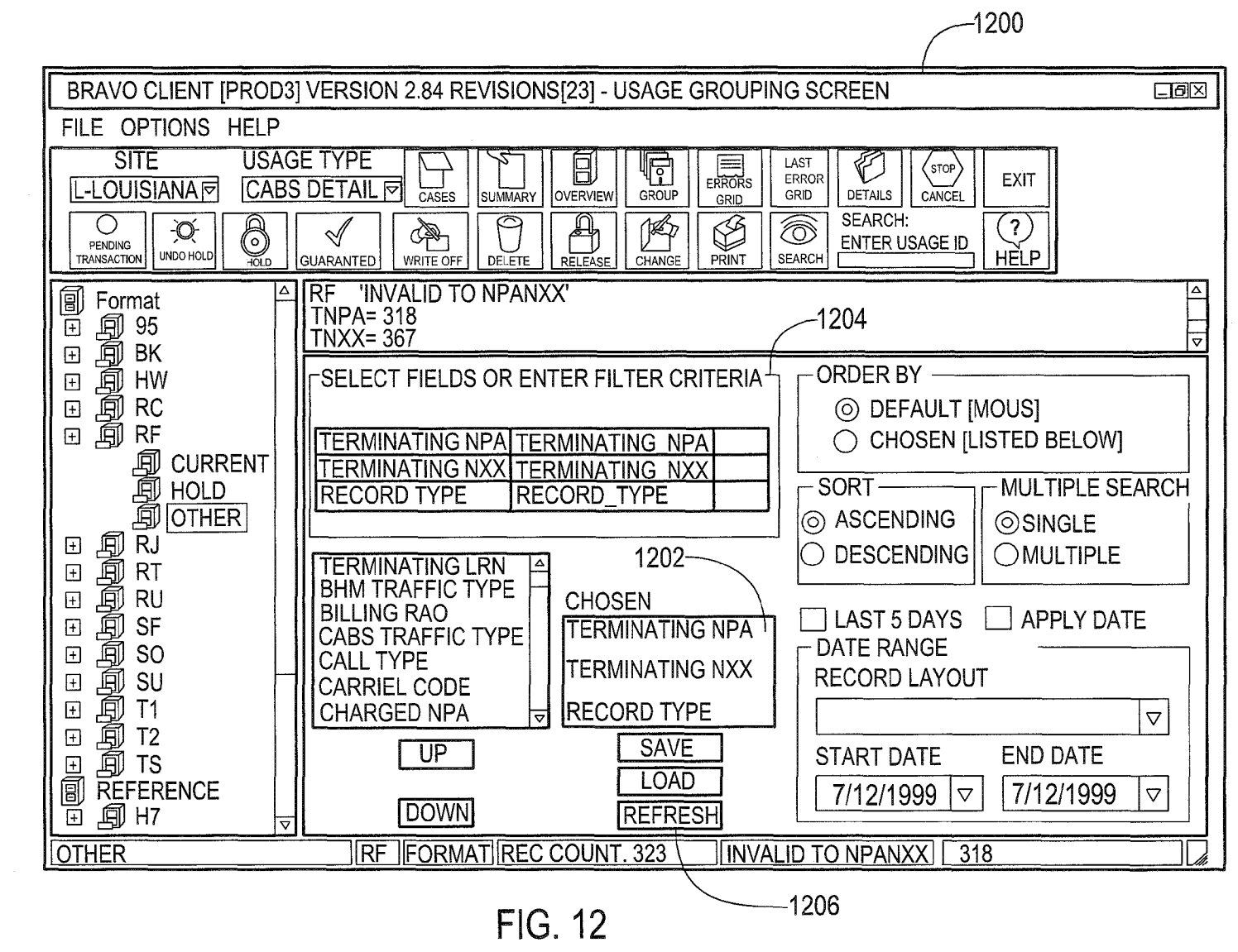

Group Button: Group button 912 is activated when individual cases are selected. When this button is clicked, the display changes to usage grouping screen 1200, shown in FIG. 12. Each error code record(s) has default fields displayed on the usage grid display screen 900 (error grid). The group button 912 allows the user to change the field criteria on the error grid 900. For example, the fields listed in the 'Chosen' box 1202 are displayed as the default fields on error grid 900. The user may remove or adds fields to the chosen box 1202 for display in the error grid 900. Additionally, users may select fields according to particular values using the 'Select Fields or Enter Filter Criteria' box 1204. Once the criteria is entered, i.e., 205 in the NPA criteria box, pressing the 'Refresh' button 1206 updates error grid 900.

Other selections can be made via usage grouping screen 1200. For example, the usage may be ordered differently, or sorted in particular ways, and search with multiple criteria may be performed. Special features are available for the selection criteria. The following table lists these features and provides a description.

TABLE 8

| Special Features | Description |
|---|---|
| % (Percent sign) | Wildcard |
| | Used to represent any portion of a field |
| | Works on any field in the criteria box |
| | For example: to view cross boundary offices for Mississippi that reside in Tennessee, enter %MS in the CLLI criteria field |
| _(Underscore) | Place Holder |
| | Used to look for a known character in a field value |
| | Works on any field in the criteria box |
| | For example: to view a field value which has a 4$^{th}$ character of 'A', the entry in the criteria box would |

TABLE 8-continued

| Special Features | Description |
|---|---|
| | be _A% where the underscore represents 3 spaces in this example. The % is a wild card and will show all values for this field that have a 4$^{th}$ character of 'A'. |

Errors Grid Button: Errors grid button 916 returns the display back to usage grid display 900, shown in FIG. 9. The fields on this screen can be sorted in either ascending or descending order by single clicking on a specific field name (i.e., CIC, CNPA, etc.) at the top of a column. A record can be displayed by highlighting it and double-clicking. The Usage Display Screen will be displayed. The order of the fields can be changed when viewing the grid. This is in addition to the procedure discussed in the group function.

Last Error Grid Button: Last error grid button 918 displays the last grid that was being worked on.

Figure 13:
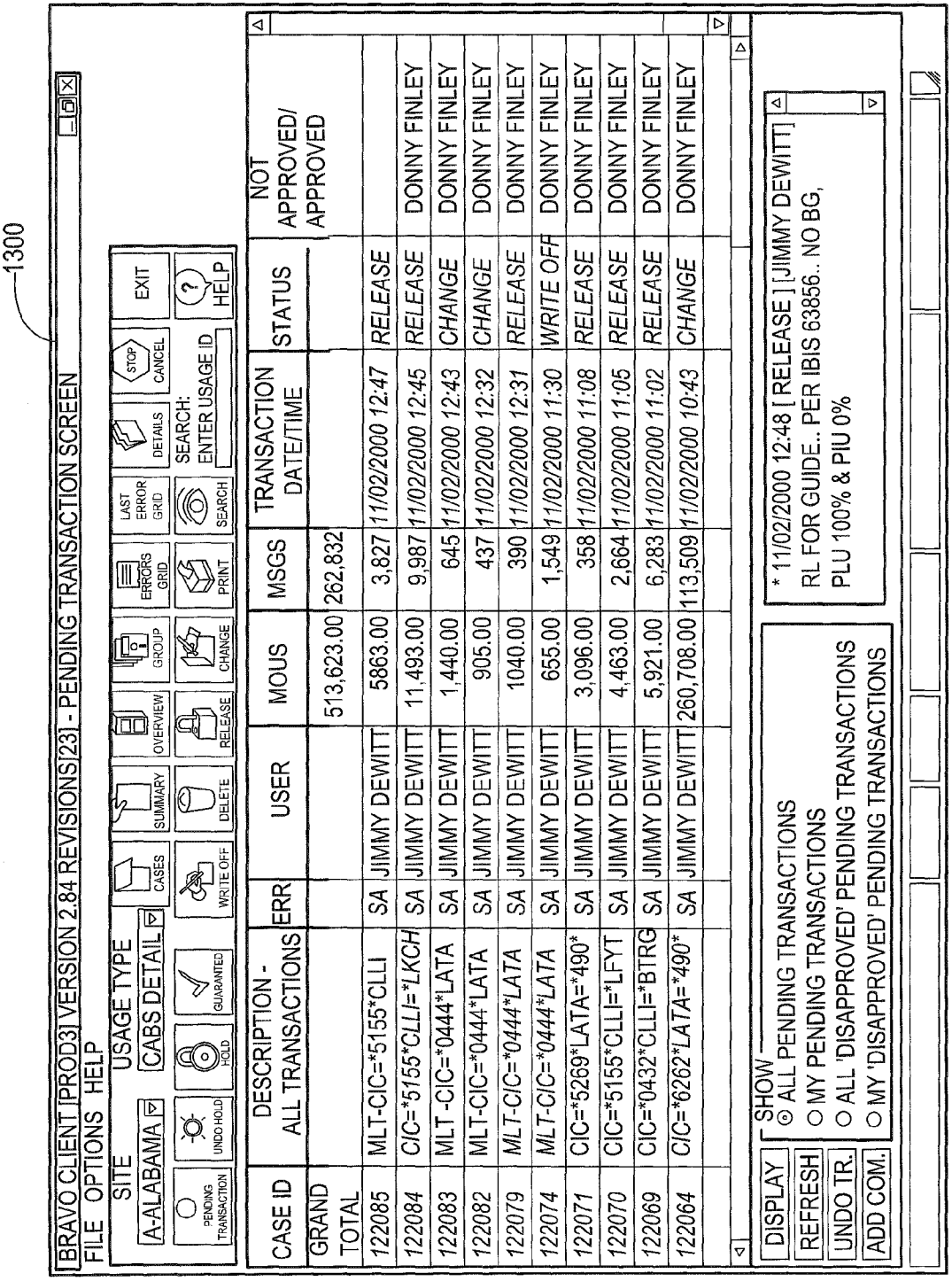
FIG. 13 is an exemplary view of a pending transaction screen provided to a user in an embodiment of the present invention.

Pending Transactions Button: Pending transactions button 920 is used to display the transactions for the current day which are displayed in the pending transaction screen 1300 in FIG. 13. The screen provides options to display: All Pending Transactions (includes everyone's); My Pending Transactions (only displays user's); All 'Disapproved' Pending Transactions, or My 'Disapproved' Pending Transactions.

Hold Button: The hold button 922 is used to allow comments to be entered for an error record and/or added to an existing transaction. Hold is activated when an error record(s) or existing case is selected from Current folder, Hold folder, or Other folder in order to enter comments about the record. Comments should be entered to a record after an IBIS Case, TTS trouble ticket, or Subject Matter Expert (SME) referral has been issued. Also, each case may need subsequent comments added for historical purposes.

Undo Hold Button: The unhold button 924 is used to return a record or group of records to Other. It does not release to pending transactions.

Guarantee Button: Guarantee button 926 is used to update a case with comments for bill guarantee. It is similar in function to write-off button 928 described below. If the messages are too old to bill or the cases have outstanding tickets, guarantee button 928 allows statistics to be pulled for the bill guarantee report.

Write-off Button: Write-off button 928 is used to produce a report for journalization of revenue that is billable but cannot be billed. The reasons for write-offs could be due to one of the following: usage trying to bill to a disconnect account; usage trying to bill to an account with the wrong carrier ID and the new ID is unknown; or usage is too old to bill.

Delete, Release, and Change Buttons: These buttons do exactly as the button implies. The function of each button is further described in Table 9.

TABLE 9

| Button | Function |
|---|---|
| Delete | The only time this button should be used is when the error does not represent billable usage: |
| | Duplicate record |
| | Test record |
| | Highlight the record/case and press Delete |
| | The 'Add Comment for Delete' screen will appear |
| | Enter reason(s) for the deletion and press OK |

TABLE 9-continued

| Button | Function |
| --- | --- |
| Release | Use this button when all corrections have been completed<br>Highlight the record/case and press Release<br>The 'Add Comment for Release' screen will appear<br>The record(s) will release with the day's transactions |
| Change | Used to change an error record<br>Highlight the record/case and press Change<br>The 'Change Transaction Screen' will appear<br>Make appropriate changes to the record and press apply<br>The fields shaded gray can not be changed<br>An occurrence on the Error Grid may have multiple records. To move from record to record, press the arrows in the lower bottom section of the Change Transaction Screen |

2. Building a Case of Usage

The follow procedures describe how to build a case of usage in the BRAVO system. The maximum number of lines that can be selected for one case is 20. However, if a case has more than 20 lines on the grid, fields not needed to identify the usage can be eliminated thereby reducing the number of distinct lines on the grid. This should free up some room for a few more lines.

The following steps can be used to build a case of usage.
1. Double-click on Other to get to the error grid Identify fields and values. 2. Manipulate the grid to see the fields and values to be worked with. 3. Select one or more lines on the grid The ability to select multiple lines by clicking and dragging, if adjacent, or by using the CTRL key plus clicking on the additional lines, if non-adjacent, is available. 4. Press the HOLD button a. Fill in the information in the pop-up box b. Open the drop down box for the Comment Type c. Select the type that is appropriate. Based on this selection, the remaining 2 boxes will be decided as shown in Table 10.5. Enter description of any information associated with this group of usage in the Comments area a. Press OK b. The usage will leave the grid and the case will appear under Hold for that error code.

TABLE 10

| If . . . | Then . . . |
| --- | --- |
| Selection "IBIS Case Sent To" is chosen | Select drop down box for Send To<br>Choose where the case was sent<br>Enter the IBIS case number in the IBIS Case input field |
| Selection "Pending CEO File Change" is chosen | Must enter the NPA NXX in the input field on the right<br>Do not enter anything in the Send To box |
| Selection "Referred To" is chosen | Choose Staff or Supervisor in the Send To box<br>Do not enter anything in the 3rd box |
| Selection "Trouble Ticket To" is chosen | A selection must be made for the Send To box<br>the error processing system of the present invention<br>IT<br>Internal<br>Enter the Trouble Ticket number in the input box |
| Selection "Work Request Sent To" is chosen | A selection must be made for the Send To box<br>the error processing system of the present invention<br>IT<br>Enter the Work Request number in the input box |
| Selection "Other" is chosen | No entry is required in the Send To or Input box |

B. Administrator GUI

This section describes the BRAVO administrator GUI and the steps an administrator takes to approve or disapprove a transaction. Thresholds may be set for transactions submitted by BRAVO users. The fields in the transaction for which thresholds have been established are: Message Days (age of usage); Minutes of Use (MOUs); Messages; Records; and Pegs.

On a daily basis, administrators should view the transactions from all sites that exceeded thresholds. Using the administrator GUI, an administrator can approve, disapprove or reset transactions. If nothing is done to a transaction requiring approval, it will remain on the "Not Approved Transactions" screen until the administrator performs this function.

1. Main Screen

Figure 14:
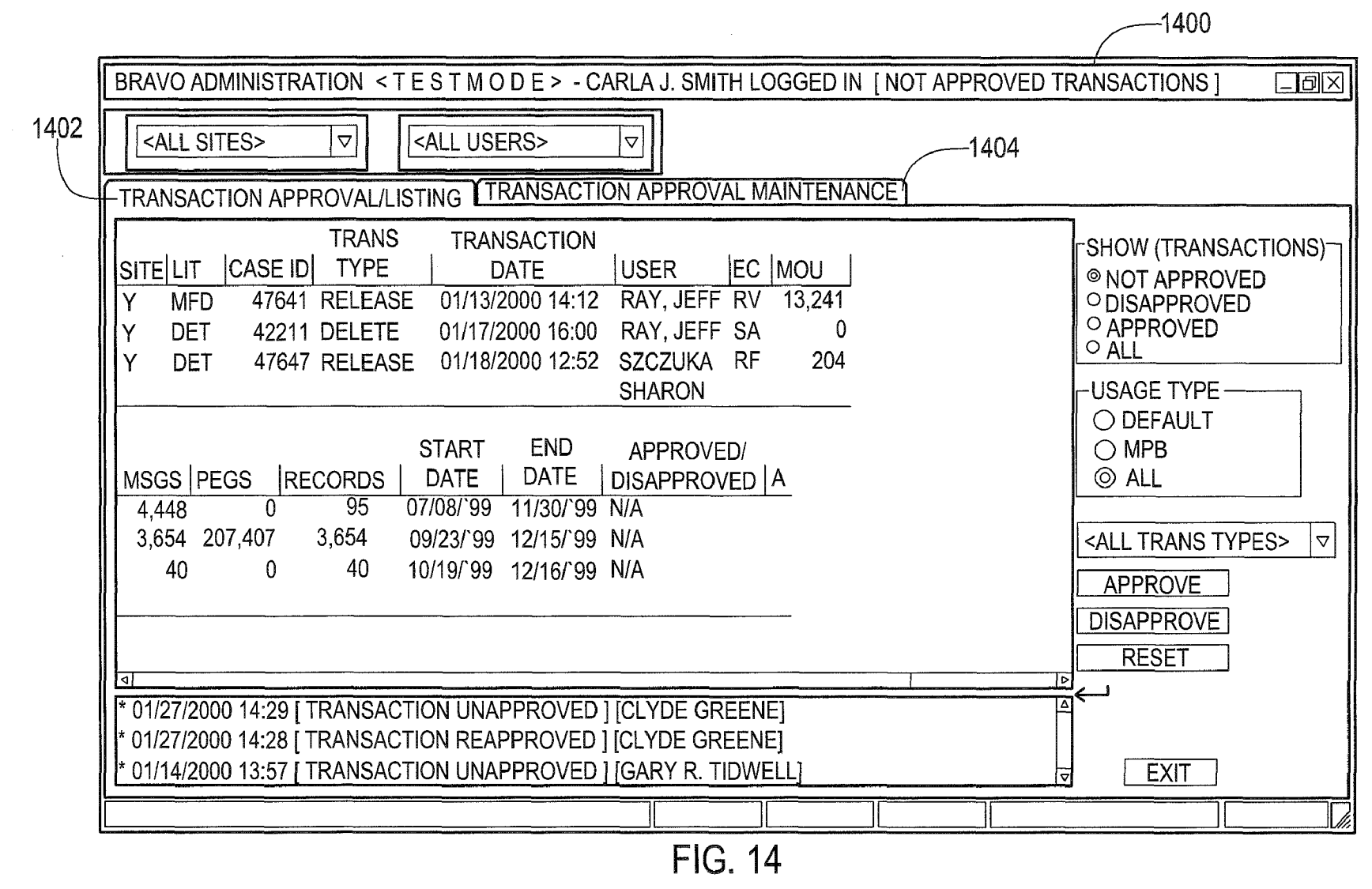

FIG. 14 shows main screen 1400 of the BRAVO administrator GUI. This screen provides access to many features. Tab 1402, Transaction Approval/Listing screen (default), opens to display all the transactions that have not yet been touched by the administrator. The version of the application is displayed at the bottom of the screen. Several displays can be viewed by the administrator from this screen which include site, user, transaction, usage type, and transaction type, described in Table 11.

TABLE 11

| Selection | Description |
| --- | --- |
| Site (drop-down box) | Provides the option of selecting all sites (default) or an individual site |
| User (drop-down box) | Provides the option of selecting all users (default) or an individual user |
| Show (Transaction) (radio button) | Provides the option of selecting transactions that have been: Not Approved (default); Disapproved; Approved; or All (includes Not Approved, Disapproved, and Approved) |
| Usage Types (drop-down box) | Provides the option of selecting the type of usage: Detail; Meet Point Billing (MPB); All (includes both Detail and MPB) (default) |
| All Trans Types (drop-down box) | Provides the option of selecting the type of transaction: All Trans Types - displays all the different types of transactions (default); Bill Guarantee; Change; Delete; Release; and Write-Off |
| Approval Buttons | Provides the option of approving, disapproving, or resetting a transaction. The button options change depending on the Show (Transaction) option selected:<br>Not Approved - Approve button is activated;<br>Disapproved - Approve and Reset buttons are activated;<br>Approved - Disapproved and Reset buttons are activated;<br>All - no buttons are activated |

Tab 1404 displays the thresholds in a transaction approval maintenance screen, shown in FIG. 15. This screen allows the administrator to maintain the various thresholds for the system.

2. Detail Display Screen

To get a detail display screen of any transaction, as shown in FIG. 16, double click on the individual transaction. Details about the transaction will be displayed at the top of the screen and a record layout will be displayed at the bottom of the screen. This is only a sampling. Not all the records within the transaction will be available only the first 50 are displayed. The detail display screen is available for all transactions whether they are Not Approved, Disapproved, or Approved.

3. Procedures

The following are steps for accessing the error processing system of the present invention Administration GUI and approving/disapproving transactions.

1. Access GUI: Select the error processing system of the present invention Administration GUI from the desktop. a. Enter CUID in the User Name; b. Enter password in appropriate field; c. Either press <enter> or the Login button 2. Select Specific Criteria: On the Transaction Approval/ Listing screen, select the site and user as appropriate a. Choose the transaction listing to be viewed by selecting Not Approved, Disapproved, Approved, or All from the display located on the right side of screen; b. Choose the transaction type by selecting Detail, MPB, or All from the display located on the right side of the screen; c. Choose the transaction type from the drop-down box located on the right side of the screen.

3. Check Transaction Details: Select a specific transaction to be viewed and double click. a. Press the Print button to print the screen; b. Press the Copy button to copy the screen for use in a document, i.e., TTS trouble ticket, e-mail, etc.; c. Press Close button to return to the Main Screen.

4. Perform Approval Function: Select one of the buttons located on the right side of the screen to either Approve, Disapprove, of Reset the transaction as described in Table 12.

5. Exit The Application: Press the Exit button to exit the error processing system of the present invention Administration GUI

TABLE 12

| If . . . | Then . . . |
|---|---|
| the administrator disapproves a transaction | the administrator is required to enter a comment stating reason |

Note:
Comments for each transaction/case is at the bottom of the transaction approval screen and is a history of comments C. Reports The BRAVO Reporting Wizard provides the ability to review reports for:

Users and for the System. The reports are available by site, date span, charge NPA/NXX, originating NPA/NXX, Detail, Meet Point Billing, etc.

1. User Reports

The available User Reports Are as follows: User Transaction Report by Employee with Comments; User Transaction Report by Employee with Comments and Case Definitions; User Transaction Report by Site with Comments; User Transaction Report by Site with Case Definitions; BRAVO Usage—Charge NPA/NXX; BRAVO Usage—Originating NPA/NXX; BRAVO Usage—Terminating NPA/NXX. Each of these reports is described in greater detail below.

The User Transaction Report by Site/Employee with Comments (FIG. 17) provides a listing of transactions performed by each BRAVO Accounting Assistant for a particular site and/or Employee within a selected date range. The report is separated by error code with subtotals including message count, MOU count, Case number, Start and Ending date range, status, and comments from each Accounting Assistant. At the end of the report is a subtotal for the site which includes total number of errors transacted, message count, MOU count, Start and Ending date range.

The User Transaction Report by Site/Employee with Comments and Case-Definitions (FIG. 18) contains the same information as the last report except it also adds a Case-Definition for each record found.

BRAVO CATTS Usage—Charge NPA/NXX (FIG. 19) provides errors codes by Charge NPA/NXX within a specified date range. Other information on the report includes CLLI, Office ID, CIC, Record Type, NPA/NXX, CABS Traffic Type, Trunk Group Number, Case number, message count, and MOU count. A Grand Total of messages and MOUs is also calculated.

BRAVO CATTS Usage—Originating NPA/NXX (FIG. 20) provides error codes by originating NPA/NXX within a specified date range. Other information on the report includes CLLI, Office ID, CIC, Record Type, NPA/NXX, CABS Traffic Type, Trunk Group Number, Case number, message count, and MOU count. A Grand Total of messages and MOUs is also calculated.

Figure 21:
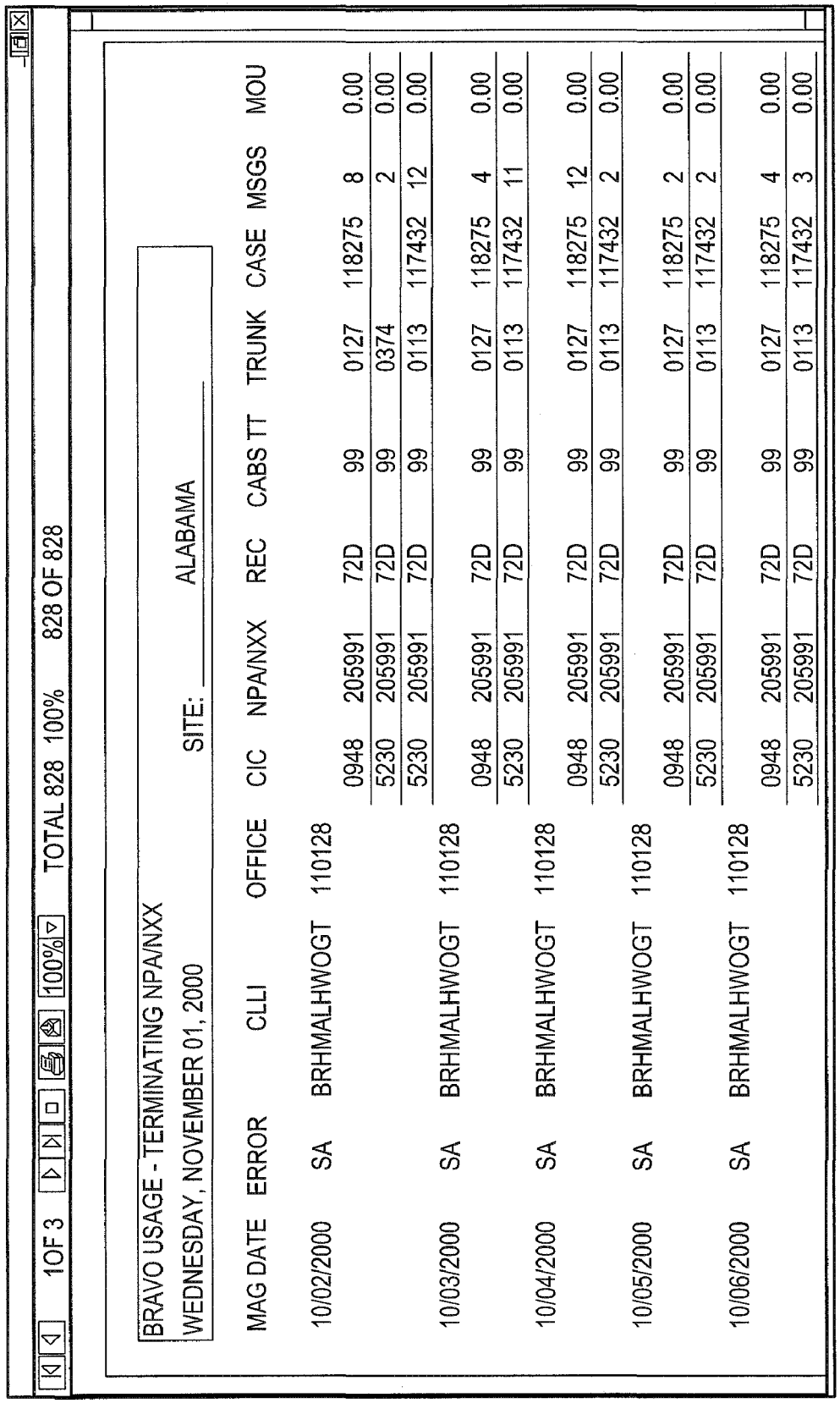
FIG. 21 is an exemplary view of a report for BRAVO CATTS Usage—Terminating NPA/NXX.

BRAVO CATTS Usage—Terminating NPA/NXX (FIG. 21) provides error codes by terminating NPA/NXX within a specified date range. Other information on the report includes CLLI, Office ID, CIC, Record Type, NPA/NXX, CABS Traffic Type, Trunk Group Number, Case number, message count, and MOU count. A Grand Total of messages and MOUs is also calculated.

2. System Reports

The available System Reports are as follows: Delete Summary Report; Write-Off Summary Report; Transmission Reports; Aging—MOU 15-60-90 Report; Aging—Pegs 15-60-90 Report; Aging—Usage Cases On Hold other than IBIS; Aging Bill Guarantee IOS/72V; Aging Bill Guarantee OTS/CABSTT; Aging DA vs. Other; Error Master File—All; Error Master File—MPB; Transacted and Untouched Usage other than IBIS. Each of these reports is described in greater detail below.

The Delete Summary Report (FIG. 22) provides error codes that have been deleted for either Detail or Meet Point Billing (MPB) usage. The report is selected by site and starting month through ending month. Each month will appear on a separate page of the report. When displayed on the screen, the ending month appears first and the starting month will be the last page of the report. A Grand Total is reported on the last page of the report which includes message count and MOU count. The report contains the error code, message count, MOU count, Status, and Start and End Dates.

The Write-Off Summary Report (FIG. 23) provides a listing of all the usage written off for a specific period of time. The report is selected by site and starting month through ending month. Each month will appear on a separate page of the report. When displayed on the screen, the ending month appears first and the starting month will be the last page of the report. A Grand Total is reported on the last page of the report which includes message count and MOU count. The report contains the error code, message count, MOU count, Status, and Start and End date.

The Transmission Reports (FIG. 24) provides several options to select concerning error code information. The reports are site and transmission date specific. The error code information can be selected by: Usage type—Detail or MPB; Transmission Type—Load or Correction; and Group By—Error Code or Carrier.

Each report contains Carrier ID, error code, record count, message count, MOU count, Peg count, and Start and End Date. Carrier subtotals are provided and a Grand Total for the site is located at the end of the report. If Transmission Type is Load, the cycle number is provided in the header of the report.

The MOU 15-60-90 Report (FIG. 25) provides a detailed listing of usage information where minute-of-use is greater than 4000. The report lists the Error-Code, CIC, Trunk-group, LATA, and a count of Minutes-of-Use by breaking this field down in increments of 0-to-15, 16-to-60, 61-to-90, and greater than 90 days old. The report is sorted in descending order by the 16-to-60 day old increment.

The PEGS 15-60-90 Report (FIG. 26) provides a detailed listing of usage information where Pegs is greater than 1000. The report lists the Error-Code, CIC, Trunk-group, LATA, and a count of Minutes-of-Use by breaking this field down in increments of 0-to-15, 16-to-60/61-to-90, and greater than 90 days old. The report is sorted in descending order by the 16-to-60 day old increment.

The Aging—DA vs. Other Report (FIG. 27) gives a detailed listing of usage information for the site that the user specifies. The report lists the Traffic-type, Error-Code, LATA, and a count of the messages which is broken down in increments of 0-to-15, 16-to-60, 61-to-90, and greater than 90 days old. The report is sorted in descending order according to the 16-to-60 field and is grouped into separate sections for DA, and all Other traffic types.

The Transacted and Unworked Usage Other than IBIS Report (FIG. 28) gives a detailed listing of usage information, other than IBIS, that has never before been seen or worked. The user must specify the site which they want to review. The report lists the Error-Code, CIC, TTS#, if one exists, Comment-Type, and a count of the Messages, Minutes, and Pegs for a each record. The report is sorted and grouped by Error-code with the appropriate subtotals, and grand total listed for messages, minutes and pegs.

The Error Master File—MPB Report (FIG. 29) provides a total of all the Meet Point Billing error codes for a specific site. The report contains the error code, description of the error, cycle number in which the error occurred, Peg count, message count, and MOU count. A Grand Total of the number of error codes, Peg count, message count, and MOU count is located on the last page of the report.

The Usage Cases On Hold Report (FIG. 30) provides cases on hold for a specific site. The report contains information about the current case information placed on hold by the Accounting Assistants. The report itself contains the IBIS Case#, BRAVO Case#, error-code, CIC, Start-Msg-Date, End MsgDate, count of Minutes of Use, and a count of the Pegs associated with that particular case. Report Parameters; Site; Usage type—Detail or MPB.

The Aging Bill Guarantee IOS/72V Report (FIG. 31) provides record-type 72V information for a specific site. The report contains the error code, CIC, LATA, Case Number, message count, MOU count, and Start and End dates. A Grand Total for message count, MOU count, the earliest Start date, and the latest End date are located at the end of the report.

The Aging Bill Guarantee OTS/CABSTT Report (FIG. 32) provides Traffic-Type 86 information for a specific site. The report contains the Error-Code, CIC, LATA, Independent Indicator, BRAVO Case #, Message count, MOU count, and Start and End dates. A Grand Total for message count, MOU count, the earliest Start date, and the latest End date are located at the end of the report.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for automating error processing and correction in legacy usage and billing systems comprising:
receiving a plurality of defective billing records containing raw usage data sent from a plurality of client computer sites, each having legacy usage and billing systems, at a centralized server site, the centralized server site including a master database;
storing the plurality of defective billing records in the master database, the plurality of defective billing records having error codes;
applying one or more sets of error processing rules to the plurality of defective billing records to correct the billing records in accordance with error codes that are defined;
sending a warning to a network administrator when a defective billing record is encountered by the one of or more error processing rules that has an undefined error code; and
sending corrected billing records from the centralized server to the client computer sites that sent the defective billing records for further processing.

2. The method of claim 1 wherein a processing rule includes a description of the rule, a rule start date, a rule end date and a rule maximum rule duration.

3. The method of claim 2 wherein a processing rule is manually extended, modified, deleted and copied into a new rule.

4. The method of claim 1 wherein a warning is sent when a predetermine threshold is met limiting the total number of records received from the one or more billing systems.

5. The method of claim 1 wherein processing rules are applied to individual errors and to classes of errors in a batch process.

6. The method of claim 1, further comprising balancing volume flows of defective billing records and sending a warning when an out of balance condition exists.

7. A computer-readable medium storing a plurality of instructions to be executed by a processor for automating error processing and correction in usage and billing systems, the plurality of instructions comprising:
receive a plurality of defective billing records containing raw usage data from one or more billing systems of client computer sites to one or more master databases of a centralized server site;
group the plurality of defective billing records by a defined error type;
send a warning to a network administrator when a defective billing record is encountered that has an error code that is not anticipated by one or more sets of error processing rules;

apply the one or more sets of error processing rules to the plurality of defective billing records to correct the billing records; and send the corrected billing records from the centralized server site to their corresponding legacy billing systems of client computer sites for further processing.

8. The computer-readable medium of claim 7 wherein a processing rule includes a description of the rule, a rule start date, a rule end date and a rule maximum rule duration.

9. The computer-readable medium of claim 8 wherein a processing rule is manually extended, modified, deleted and copied into a new rule.

10. The computer-readable medium of claim 7 wherein a warning is sent when a predetermine threshold is met limiting the total number of records received from the one or more billing systems.

11. The computer-readable medium of claim 7 wherein statistics processing rules are applied to individual errors and to classes of errors in a batch process.

12. The computer-readable medium of claim 7, the plurality of instructions further comprising balancing volume flows of defective billing records and sending a warning when an out of balance condition exists.

* * * * *